ELECTROSTATIC COPIER

Filed June 30, 1964 15 Sheets-Sheet 1

INVENTORS
E. PAUL CHARLAP
FRITZ BAUMGARTEN
LOTHAR FISCHER
BY Shenier & O'Connor
ATTORNEYS

ELECTROSTATIC COPIER

Filed June 30, 1964 15 Sheets-Sheet 2

INVENTORS
E. PAUL CHARLAP
FRITZ BAUMGARTEN
LOTHAR FISCHER
BY Shenier & O'Connor
ATTORNEYS Jan. 20, 1970 E. P. CHARLAP ET AL 3,490,843

ELECTROSTATIC COPIER

Filed June 30, 1964 15 Sheets-Sheet 3

INVENTORS
E. PAUL CHARLAP
FRITZ BAUMGARTEN
LOTHAR FISCHER

BY Shenier & O'Connor
ATTORNEYS

INVENTORS
E. PAUL CHARLAP
FRITZ BAUMGARTEN
LOTHAR FISCHER
BY Shenier & O'Connor
ATTORNEYS

INVENTORS
E. PAUL CHARLAP
FRITZ BAUMGARTEN
LOTHAR FISCHER

BY Shenier & O'Connor
ATTORNEYS

ELECTROSTATIC COPIER

Filed June 30, 1964

INVENTORS
E. PAUL CHARLAP
FRITZ BAUMGARTEN
LOTHAR FISCHER
BY
Shenier & O'Connor
ATTORNEYS Jan. 20, 1970 E. P. CHARLAP ET AL 3,490,843

ELECTROSTATIC COPIER

Filed June 30, 1964 15 Sheets-Sheet 7

INVENTORS
E. PAUL CHARLAP
FRITZ BAUMGARTEN
LOTHAR FISCHER
BY
Shenier & O'Connor
ATTORNEYS

ELECTROSTATIC COPIER

INVENTORS
E. PAUL CHARLAP
FRITZ BAUMGARTEN
LOTHAR FISCHER
BY Shenier & O'Connor
ATTORNEYS INVENTORS
E. PAUL CHARLAP
FRITZ BAUMGARTEN
LOTHAR FISCHER
BY Shenier & O'Connor
ATTORNEYS INVENTORS
E. PAUL CHARLAP
FRITZ BAUMGARTEN
LOTHAR FISCHER
BY Shenier & O'Connor
ATTORNEYS Jan. 20, 1970 E. P. CHARLAP ET AL 3,490,843

ELECTROSTATIC COPIER

Filed June 30, 1964 15 Sheets-Sheet 11

INVENTORS
E. PAUL CHARLAP
FRITZ BAUMGARTEN
LOTHAR FISCHER
BY Shenier & O'Connor
ATTORNEYS INVENTORS
E. PAUL CHARLAP
FRITZ BAUMGARTEN
LOTHAR FISCHER
BY
Shenier & O'Connor
ATTORNEYS INVENTORS
E. PAUL CHARLAP
FRITZ BAUMGARTEN
LOTHAR FISCHER
BY Shenier & O'Connor
ATTORNEYS INVENTORS
E. PAUL CHARLAP
FRITZ BAUMGARTEN
LOTHAR FISCHER
BY
Shenier & O'Connor
ATTORNEYS

ELECTROSTATIC COPIER

Filed June 30, 1964

INVENTORS
E. PAUL CHARLAP
FRITZ BAUMGARTEN
LOTHAR FISHER
BY Shenier & O'Connor
ATTORNEYS 3,490,843
ELECTROSTATIC COPIER E. Paul Charlap, Scarsdale, N.Y., and Fritz Baumgarten, Giessen-Heuchelheim, and Lothar Fischer, Giessen-Wieseck, Germany, assignors to Savin Business Machines Corporation, New York, N.Y., a corporation of New York Filed June 30, 1964, Ser. No. 379,232
Int. Cl. G03g *15/00*
U.S. Cl. 355—14 7 Claims

ABSTRACT OF THE DISCLOSURE

An electrostatic copy machine in which a first switch in an original transport path is actuated concomitantly to energize a corona, exposure lamps and a copy material feed clutch and in which a second switch in the original transport path provides a holding circuit for the corona and exposure lamps. When the trailing edge of the original leaves the first switch, a cutter operates to cut the copy material and the feed clutch is de-energized. When the trailing edge of the original leaves the second switch, the corona and the exposure lamps are de-energized.

Our invention relates to an electrostatic copier and more particularly to an improved electrostatic copier which is readily adapted for use with a wet developer or with a dry developer.

There are known in the prior art many forms of electrostatic copying machines in which in response to passage of an original into the machine, a copy is produced on a sheet of copy material. While many of these machines satisfactorily accomplish the object of producing a copy, they embody a number of defects or limitations. First, most of the machines of the prior art employ individual sheets of copy material which must be fed into the machine with the original to produce the required copy. Thus, they are limited as a rule to making copies of standard size sheets and where outsize sheets are to be copied, the operation must be accomplished in a number of operations using separate sheets of copy material. A second disadvantage of copying machines of the prior art is that the path of the paper through the machine is not readily accessible in the event that, for example, the paper jams. Machines of the prior art are limited either to the use of a dry developer system or to the use of a liquid developer system. In order to make more than a single copy with most machines of the prior art, it is necessary to reinsert the original into the machine. Machines of the prior art which have any degree of versatility are inordinately large and cumbersome.

We have invented an electrostatic copier which overcomes the disadvantages of the prior art pointed out hereinabove. Our machine is adapted to make a copy which is precisely the same length as is the original with the copied material oriented on the sheet correspondingly to its disposition on the original. Our machine permits ready access to the path of the original and to the path of the copy material. It is readily adaptable for use with a liquid developer system or for use with a dry developer system. Our machine comprises mechanism for rapidly and expeditiously making multiple copies without necessitating reinsertion of the original into the machine. Our machine is compact for the results achieved thereby.

One object of our invention is to provide an electrotatic copier which overcomes the disadvantages of electrostatic copiers of the prior art.

Another object of our invention is to provide an electrostatic copier which is readily adapted for use with a liquid developer or for use with a dry developer.

A further object of our invention is to provide an electrostatic copier which affords ready access to the paths of travel of the original and the copy material through the machine.

Still another object of our invention is to provide an electrostatic copier for making multiple copies in a rapid and expeditious manner.

A still further object of our invention is to provide an electrostatic copier which produces a copy of precisely the length of the original inserted into the machine over a wide range of lengths.

Yet another object of our invention is to provide an electrostatic copier which is compact for the result achieved thereby.

Other and further objects of our invention will appear from the following description.

In general our invention contemplates the provision of an electrostatic copier in which in response to passage of an original through the machine, copy material from a roll is fed through cutting, charging, exposure and curing zones. The copy is cut to precisely the length of the original. Selectively we provide our machine with a wet developing system or with a dry developing system. Our machine includes automatically resetting multiple copy mechanism. The parts of our machine are removable or displaceable relative to the machine to permit ready access to the paths of the original and of the copy.

In the accompanying drawings which form part of the instant specification and which are to be read in conjunction therewith and in which like reference numerals are used to indicate like parts in the various views.

Figure 1:
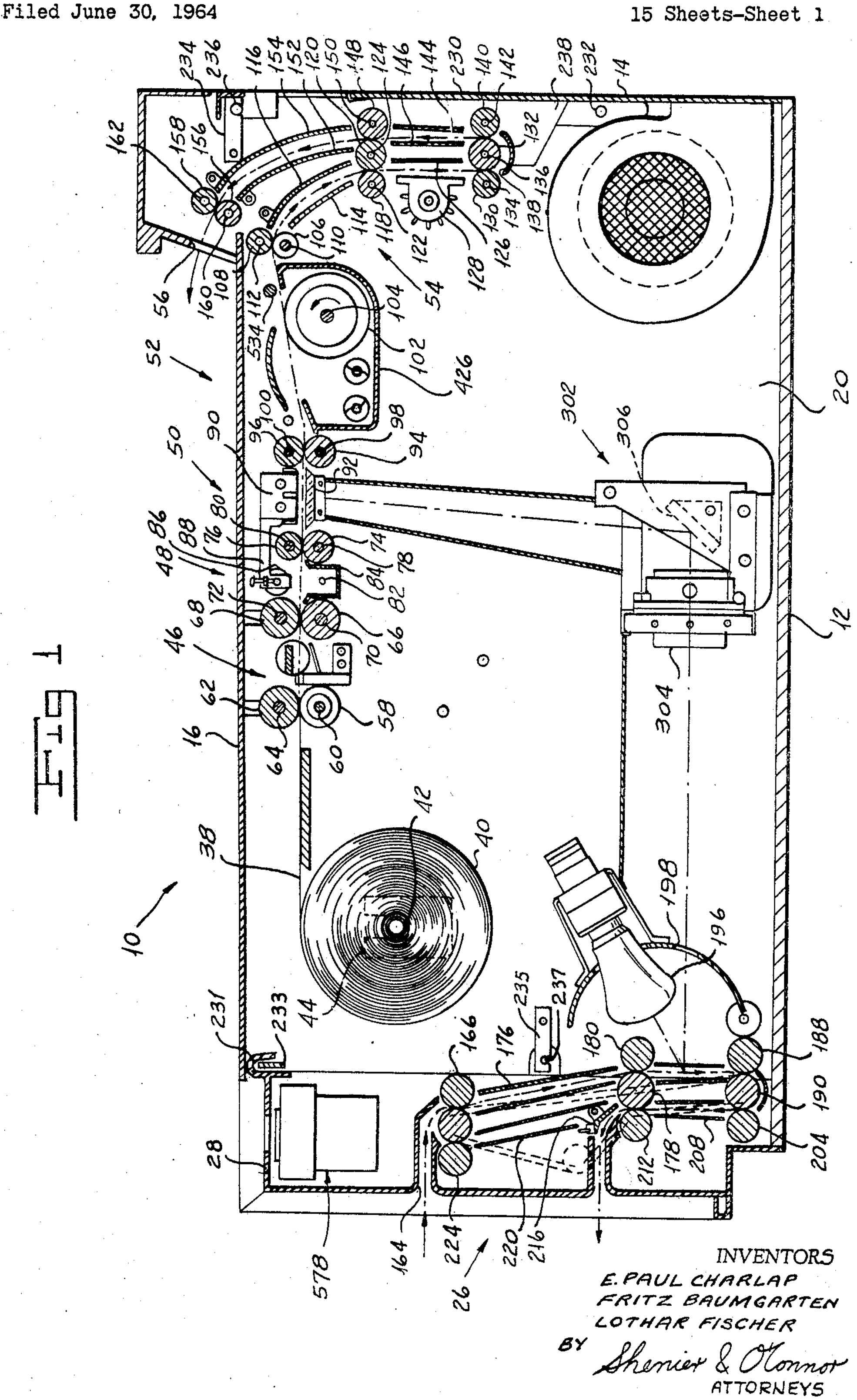
FIGURE 1 is a sectional view illustrating a form of our improved electrostatic copier having a dry developer system.
Figure 2:
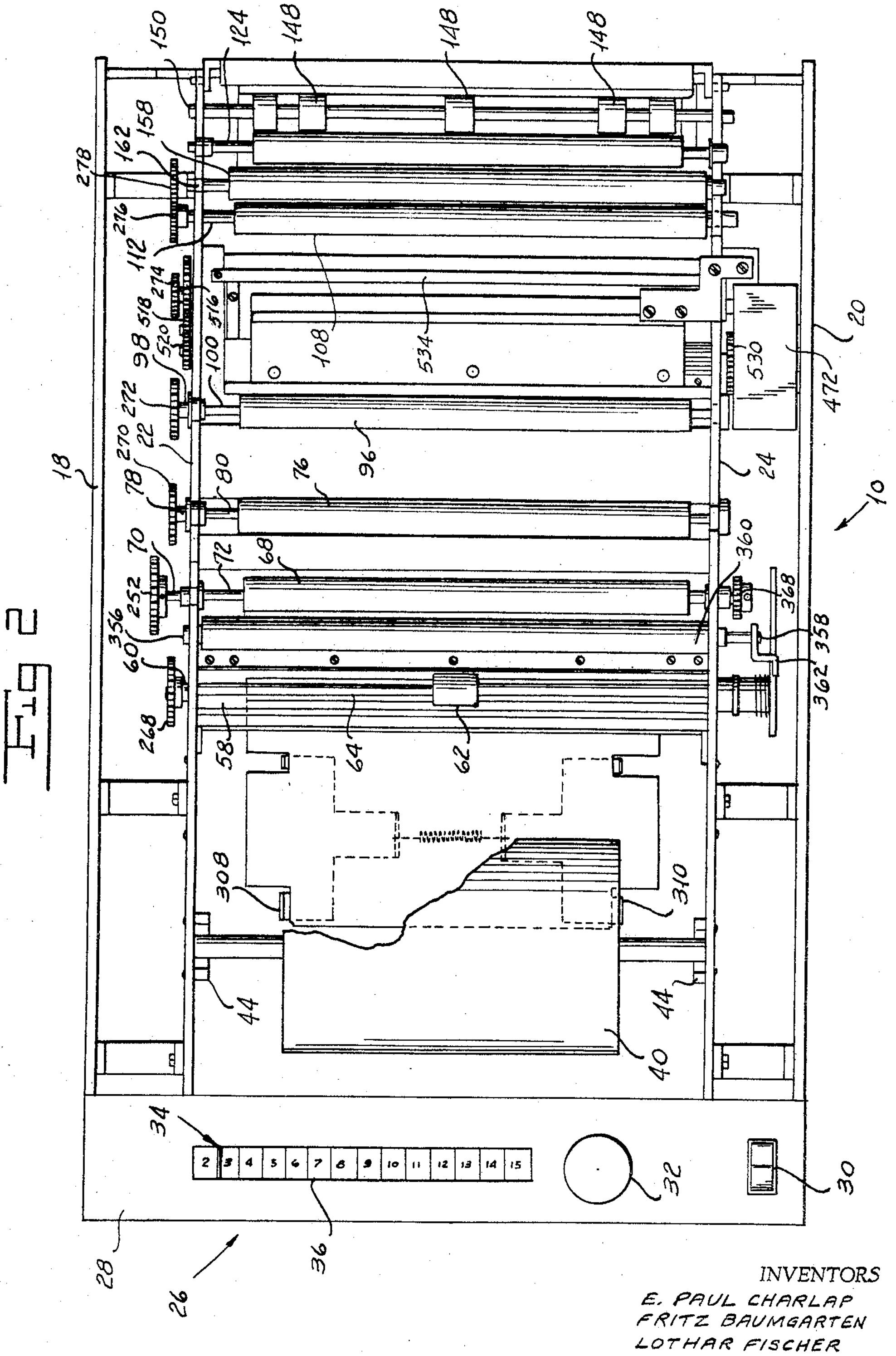
FIGURE 2 is a top plan view of the form of our electrostatic copier illustrated in FIGURE 1.
Figure 3:
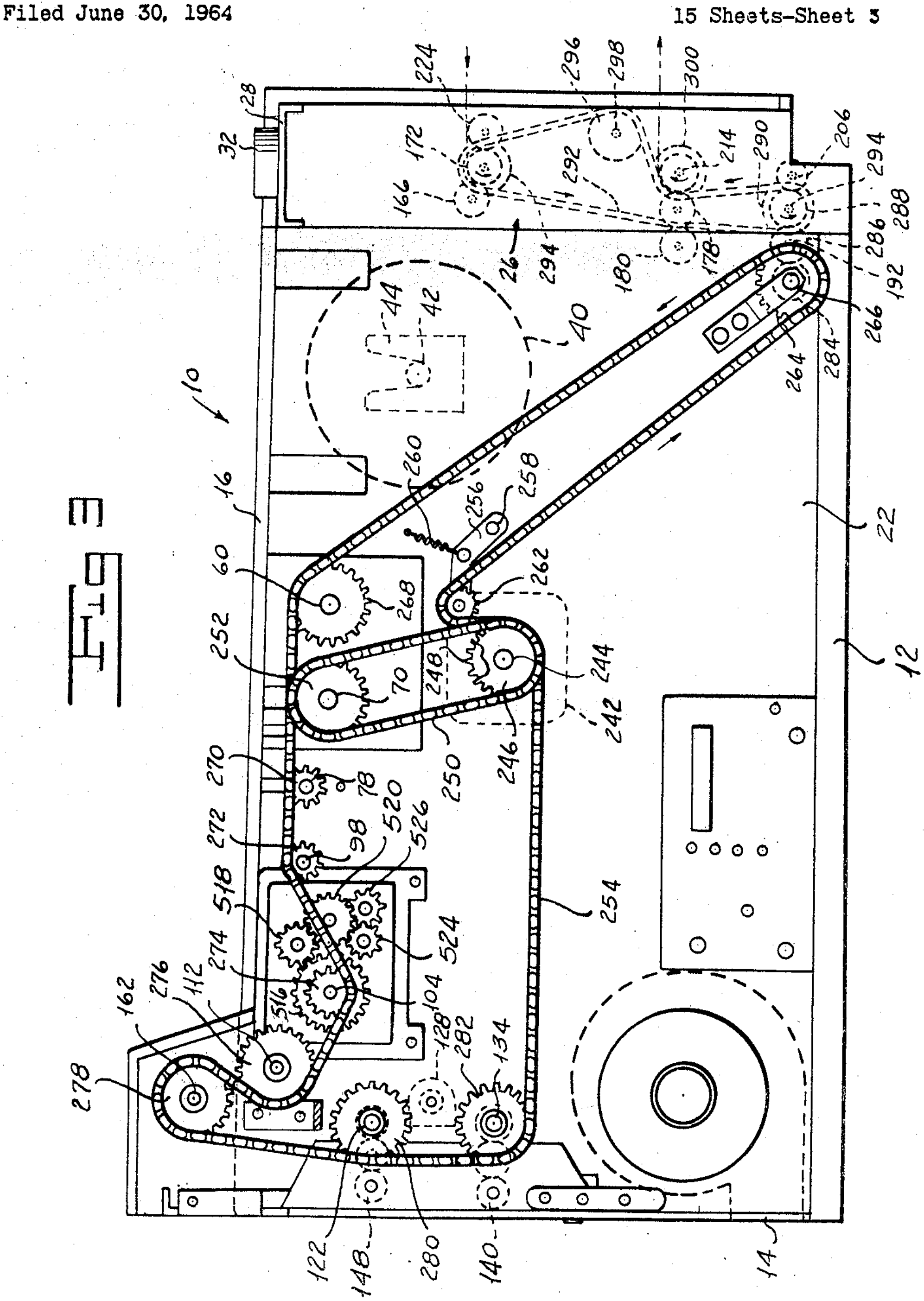
FIGURE 3 is a side elevation of our electrostatic copy machine with a side panel removed illustrating the drive system of the machine.

Referring now to FIGURES 1 to 3, one specific form of our electrostatic copier indicated generally by the reference character 10 has a base 12, a back 14, a top 16, and removable side panels 18 and 20. Within the machine is the main machine frame including respective bearing support plates 22 and 24 held in spaced relationship by any suitable means known to the art.

We detachably mount an original transport system indicated generally by the reference character 26 at the front of the machine 10. The top 28 of the unit 26 carries a push button 30 for turning the machine on and off, as well as a knob 32 which can be actuated to set the machine to make a plurality of copies. Knob 32 moves a pointer 34 to a position with relation to a scale 36 at which the pointer indicates the number of copies the machine is set to make.

In a manner to be described hereinafter, as an original moves through the original transport system 26, copy material such as copy paper 38 is drawn from a roll 40 carried by a shaft 42 supported in brackets 44 carried by the plates 22 and 24. The copy material being drawn from the roll 40 successively passes through a cutting station indicated generally by the reference character 46, a corona system indicated generally by the reference character 48, a copy paper exposure station 50, a developing station 52 and a fixing system indicated generally by the reference character 54. Ultimately the developed copy passes outwardly through an opening 56 onto the upper surface of the top 16 to a position at which it is accessible to the operator of the machine.

More specifically, when a copy is being made, a copy paper lower feed roll 58 is clutched to a shaft 60 to cause the paper to be drawn through the nip between the roll 58 and an upper feed roll 62 carried by a shaft 64. After passing through the cutter station 46, the copy material passes through the nip between a pair of feed rolls 66 and 68 carried by shafts 70 and 72. A pair of guide rolls 74 and 76 supported on shafts 78 and 80 carry the copy paper from the corona station 48 to the exposure station 50. As is known in the art, the copy material 38 carries a coating of photoconductive material such, for example, as zinc oxide or the like. As the length passes through the station 48, it is subjected to a potential between a corona discharge wire 82 disposed in a housing 84 and a ground roller 86 carried by a bracket 88. Having thus received a charge, the paper passes between a guide 90 on bracket 88 and a window 92 through which an image of the original to be copied is focused on the paper in a manner to be described.

Respective feed rolls 94 and 96 carried by shafts 98 and 100 carry the copy paper from the exposure station 50 to the developer station 52. It will readily be understood by those skilled in the art that as the copy material carrying an electrostatic charge is exposed to the image to be copied, the charge leaks off in the relatively lighter area of the image and is retained over the relatively darker areas of the image. After having passed through the nip between rollers 94 and 96, the copy paper rides over a toner roller 102 carried by a shaft 104. As will be described in detail hereinafter, as the copy paper passes by the toner roller 102 it is brushed with particles of toner which are attracted to the charged areas of the material so as to be adhered thereto to develop a latent image on the copy material. As is known in the art, the toner may, for example, be powdered resinous material having a color which contrasts with that of the copy material 38.

As the copy material 38 leaves the developer station 52, it passes through the nip between rollers 106 and 108 carried by shafts 110 and 112. The rolls 106 and 108 feed the copy material to the space between a pair of guides 114 and 116 which lead to a pair of feed rolls 118 and 120 carried by shafts 122 and 124. The copy material 38 then passes through the space between a guide 126 and a heater 128 which applies sufficient heat to the particles of toner carried by the sheet to fuse them to the sheet without at the same time scorching the sheet.

Guide rolls 130 and 132 carried by shafts 134 and 136 feed the copy material to an arcuate guide 138 which directs the leading edge of the sheet up into the nip between the roll 132 and a roll 140 carried by a shaft 142. The sheet is then fed upwardly between guides 144 and 146 to the nip between the roll 120 and a roll 148 carried by a shaft 150. As will be dscribed in detail hereinbelow, when the original has passed through the original transport system 26, the length of material 38 being fed from the roll 40 has been cut to the length of the original. The cut sheet is fed by rolls 120 and 148 to guides 152 and 154 which direct the sheet to the nip between rolls 156 and 158 carried by shafts 160 and 162. These terminal rollers 156 and 158 direct the sheet through opening 56 onto the upper surface of the top 16 where is is accessible to the operator.

Figure 4:
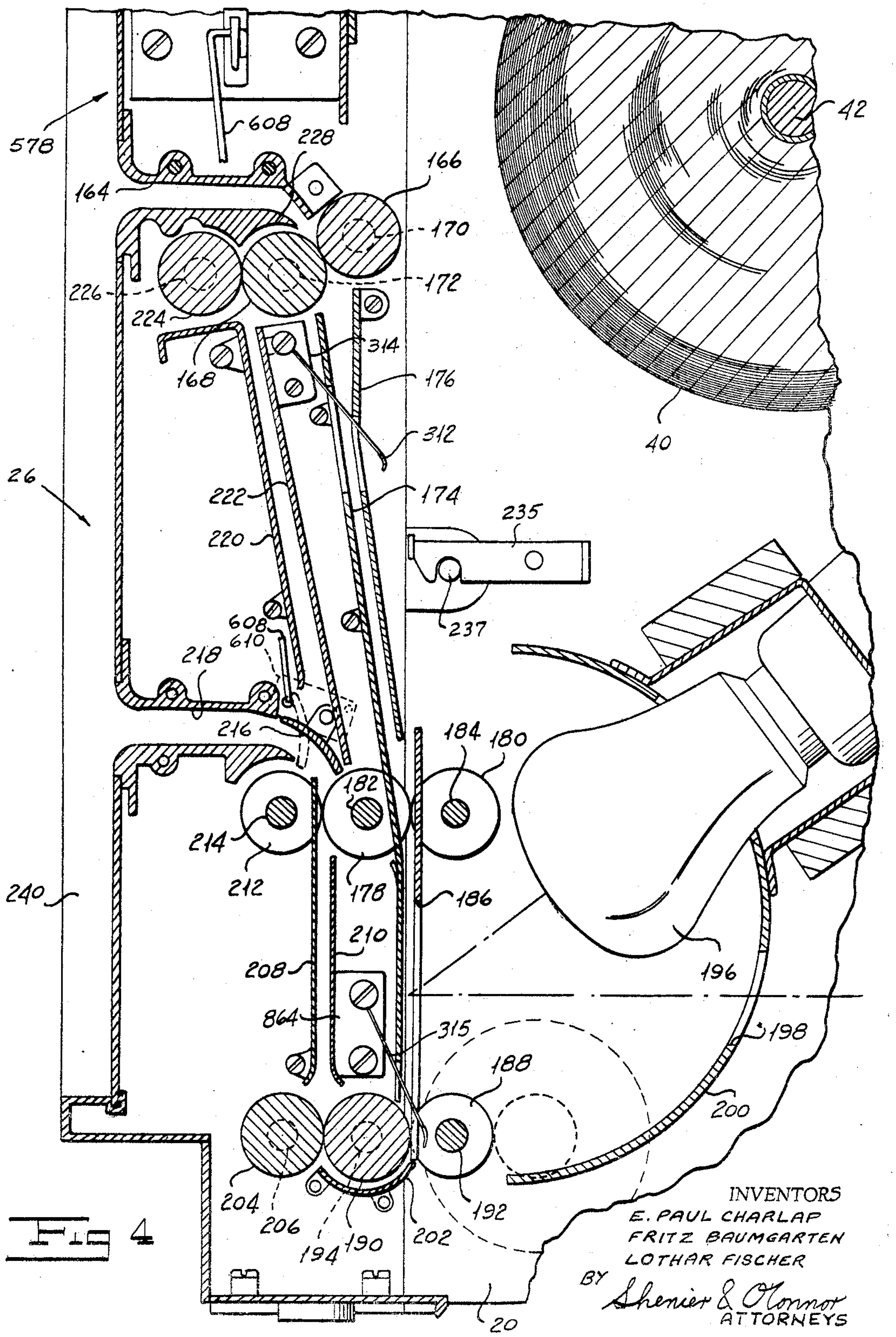
FIGURE 4 is a fragmentary sectional view of our improved electrostatic copier illustrating the original transport mechanism thereof.
Figure 5:
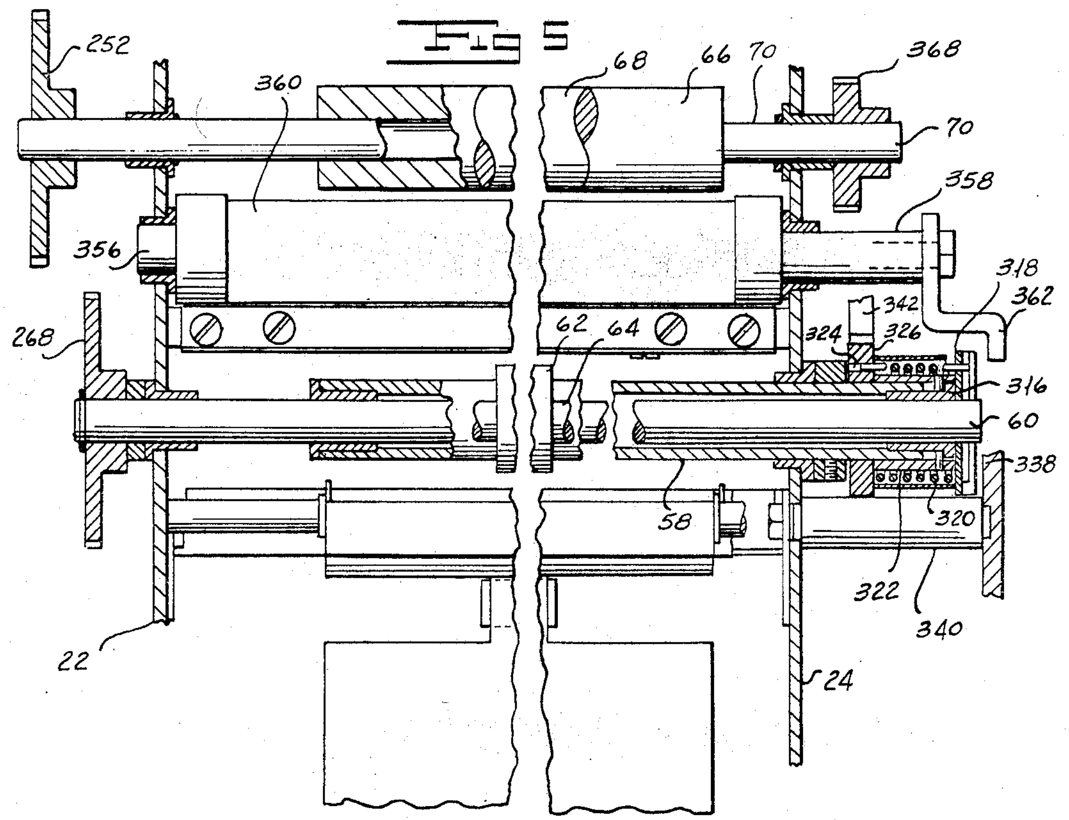
FIGURE 5 is a fragmentary sectional view of the copy material feeding and cutting mechanism of our improved electrostatic copier.
Figure 6:
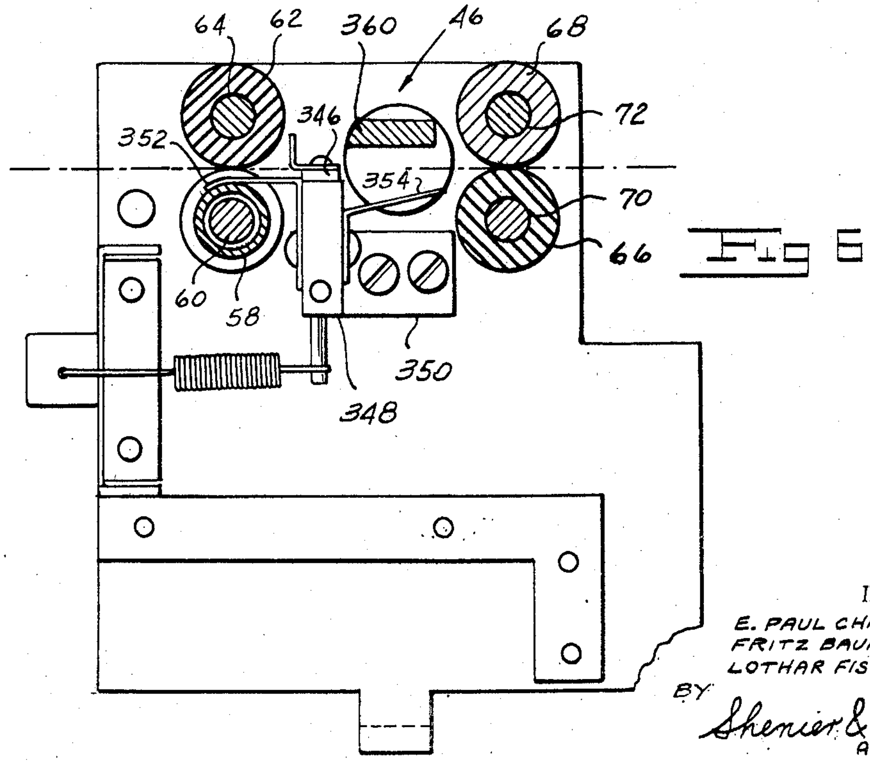
FIGURE 6 is a sectional view of the copy material feeding and cutting mechanism of our improved electrostatic copier.

Referring now to FIGURES 1 and 4, an original to be copied is fed to the system 26 by passing it into an opening 164 to the nip between feed rolls 166 and 168 carried by shafts 170 and 172. Guides 174 and 176 direct the original from rolls 166 and 168 to the nip between rolls 178 and 180 carried by shafts 182 and 184. Rolls 178 and 180 guide the original toward an exposure window 186 to the nip between rolls 188 and 190 carried by shafts 192 and 194. As the original passes by the window, light from a source 196 is directed onto its surface to reflect an image from the sheet through an opening 198 in a light reflector 200 along a path indicated by the dot-dash line in FIGURE 4.

As the leading edge of the original emerges from between rolls 188 and 190, it engages a guide 202 which directs the original to the nip between roll 190 and a roll 204 carried by a shaft 206. The sheet is then directed upwardly as viewed in the Figures and is guided by guides 208 and 210 to the nip between roll 178 and a roll 212 carried by shaft 214.

Our original transport system comprises a baffle 216 adapted to be moved in a manner to be described between the full line position shown in FIGURE 4 and the broken line position. In the full line position of the baffle 216, it directs the original out through an opening 218 through which it is returned to the user. In the broken line position of the baffle, the leading edge of the original moves upwardly past the baffle to guides 220 and 222 which carry the original upwardly to a nip formed by roll 168 and a roll 224 carried by a shaft 226. When this occurs, a guide 228 on one of the walls of the opening 164 directs the original back to the nip between rolls 166 and 168 to cause the original to be recycled through the system 26. It will readily be apparent from the structure just described that the broken line position of the baffle 216 is that position it occupies when multiple copies of a single original are to be made.

From the structure described thus far, it will be apparent that shafts 60, 64, 70, 72, 78, 80, 98, 100, 104, 122, 134, 184 and 192 are supported on the main frame plates 22 and 24 or on subassembly support plates carried by these members. We mount the shafts 124, 136, 142 and 150 on a backdoor assembly comprising a door 230 which is secured to the back 14 of the machine by hinge pins 232. Any suitable means, such as a releasable catch 234 on the main frame, may engage a pin 236 on the door 230 to retain the door in its closed position. Inwardly extending flanges 238 support the shafts 124, 136, 142 and 150, as well as the guides 126, 144 and 146.

The side walls 240 of the original transport unit 26 carry shafts 170, 172, 182, 184, 192, 194, 206, 214 and 226, as well as the guides of the original transport mechanism. We removably mount the unit 26 on the machine in any convenient manner. For example, hangers 231 on the assembly 26 may engage a bracket 233 on the main machine body. Latches 235 engage pins 237 on the assembly 26 to hold it in position.

Referring now to FIGURES 1 to 3, the drive system of our machine includes a drive motor 242 supported on the plate 22 for example. Motor 242 is adapted to be energized in a manner to be described to drive a shaft 244 carrying a pair of sprocket wheels 246 and 248. Wheel 246 drives a pitch chain 250 in engagement with a sprocket wheel 252 on the shaft 70. When energized, motor 242 drives shaft 244 in a counterclockwise direction as viewed in FIGURE 3 to drive shaft 70 in a counterclockwise direction. Sprocket wheel 248 drives a pitch chain 254 which provides the main drive for the machine. A bracket 256 swingably supported on a pin 258 on plate 18 is normally urged by a spring 260 to swing in a clockwise direction as viewed in FIGURE 3. Bracket 256 carries a sprocket wheel 262 which engages the chain 254 to take up the slack in the chain.

Chain 254 extends from sprocket wheel 262 around a wheel 264 on shaft 266 carried by a bracket on plate 22 and thence upwardly to sprocket wheels 268 and 270 carried by shafts 60 and 78. From wheel 270, chain 254 extends over a sprocket wheel 272 on shaft 98, under a wheel 274 on shaft 104, under a sprocket wheel 276 on shaft 112 and over a wheel 278 on shaft 162. From the wheel 278, chain 254 passes downwardly and into driving engagement with a sprocket wheel 280 on shaft 122 and under a wheel 282 on shaft 134 and back to wheel 248.

From the structure just described, it will be seen that when motor 242 is energized, shafts 60, 78, 98, 162, 122, 134 and 266 all are driven in a counterclockwise direction as viewed in FIGURE 3. Shafts 104 and 112 are driven in a clockwise direction. Shaft 266 carries for rotation therewith a gear 284 which engages a gear 286 on shaft 192. Gear 286 drives a gear 288 on shaft 194 to drive a sprocket wheel 290. Wheel 290 drives a pitch chain 292 which extends upwardly from the sprocket wheel 290 to a wheel 294 on shaft 172 and then downwardly around an idling, chain-tensioning sprocket wheel 296 on a shaft 298 carried by the unit 26. From wheel 296 the chain 292 extends over and drives a sprocket wheel 300 on shaft 214. It will be appreciated that with the unit 26 assembled on the machine, gear 288 is brought into driving engagement with gear 286. When motor 242 is energized to drive shaft 266 in a counterclockwise direction, shaft 192 is driven in a clockwise direction to drive shaft 172 in a counterclockwise direction and to drive shaft 214 in a clockwise direction through the medium of chain 292.

Referring to FIGURE 2, the main frame of the machine carries a pair of adjustable copy material guides 308 and 310 between which the copy paper passes in its travel toward the feed rolls 58 and 62. The distance between the guides 308 and 310 can be adjusted to accommodate copy material of varying widths.

Referring again to FIGURES 1 and 4, as has been explained hereinabove, as the original is carried past window 186, light from a source 196 impinges on the surface of the original and an image thereof is reflected back through opening 198 in the reflector 200. The base 12 carries an optical system indicated generally by the reference character 302 comprising a lens 304 through which the reflected image passes to a mirror 306 which directs the image upwardly through the window 92 over which the copy material is passing.

As has been explained hereinabove, when the push button 30 is actuated to turn the machine on, the chains 254 and 292 drive the various rollers in the manner set forth hereinabove. When the machine is to make a copy, the original is inserted into the opening 164 and is advanced by rolls 166 and 168 through the space between guides 174 and 176 until it engages a feeler 312 adapted to operate a microswitch 314. One of the operations to be performed in response to operation of the switch 314 is the initiation of the copy paper feeding operation. As has been explained, this operation is achieved by clutching roll 58 to the shaft 60. As it continues its travel through the original transport system, the original engages a lower feeler 315 to actuate a switch 864. While we have shown switches 314 and 864 as being mounted on the removable unit 26, they may more conveniently be carried by the main machine body to facilitate the making of the necessary electrical connections.

Referring now to FIGURES 5 to 9, we dispose a bearing 316 between the end of shaft 60 and the end of roller 58 outboard of the plate 24. The end of shaft 60 carries for rotation therewith a feed-spring washer 318. Washer 318 receives one end of a clutch spring 320 coiled around a clutch drum 322 secured to roller 58 for rotation therewith. We dispose the other end of the spring 320 in an opening 324 in a clutch brake disc 326 loosely supported on the roller 58. It will thus be seen that normally as shaft 60 turns, washer 318 turns and drives the disc 326 through the medium of the spring 320. Owing to the fact that the disc is loosely mounted on the roller 58, it rotates freely thereon.

We provide our machine with a solenoid 328 adapted to be energized in a manner to be described in response to the actuation of the switch 314 first operated by the leading edge of the original. In response to energization of the solenoid 328, its armature 330 moves to the right as viewed in FIGURE 7. A spring 332 connects the armature 330 to one end of an actuating lever 334 pivotally supported on a shaft 336 carried by plate 24. We mount a brake shoe 342 on the end of lever 334 remote from the spring 332.

Figure 7:
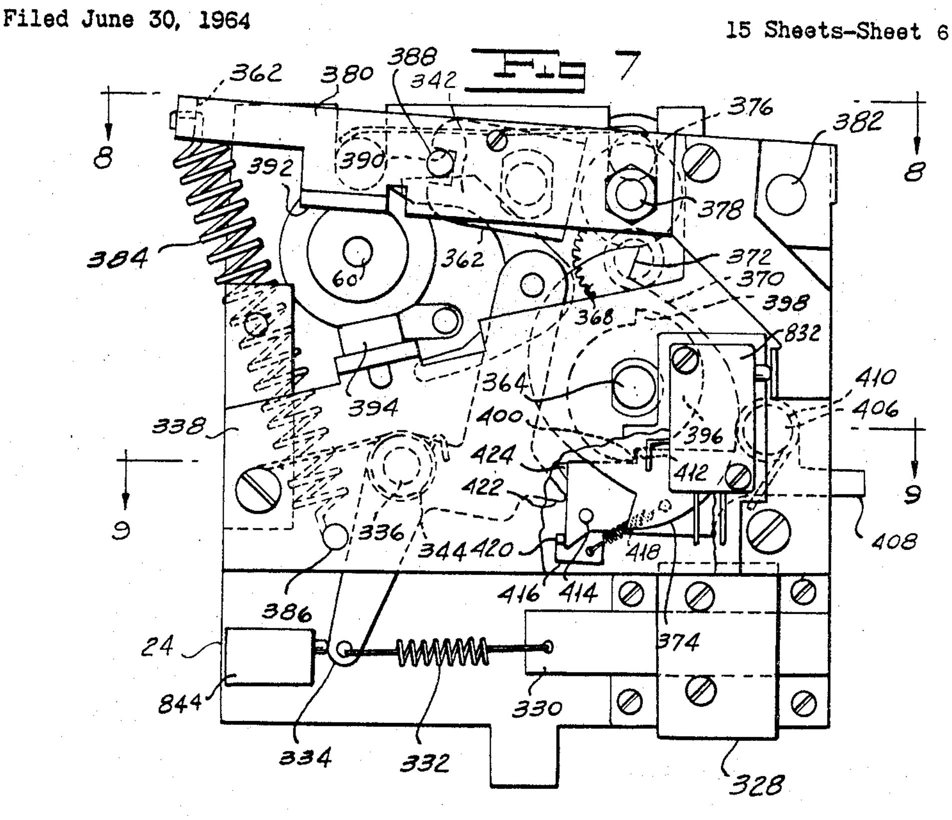
FIGURE 7 is a side elevation of the paper feeding and cutting mechanism of our improved electrostatic copier.
Figure 8:
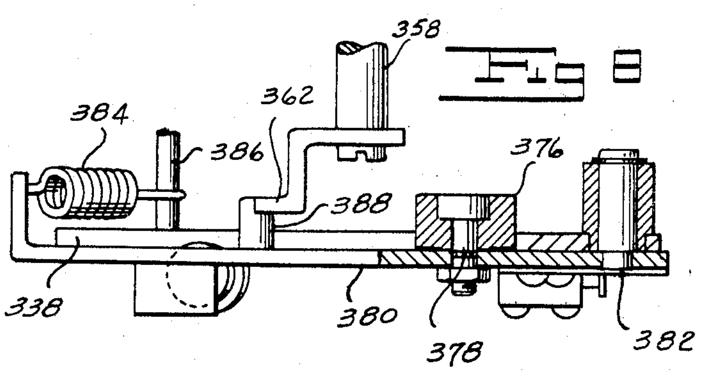
FIGURE 8 is a fragmentary top plan view of the mechanism shown in FIGURE 7 taken along the line 8—8 of FIGURE 7 with parts broken away.
Figure 9:
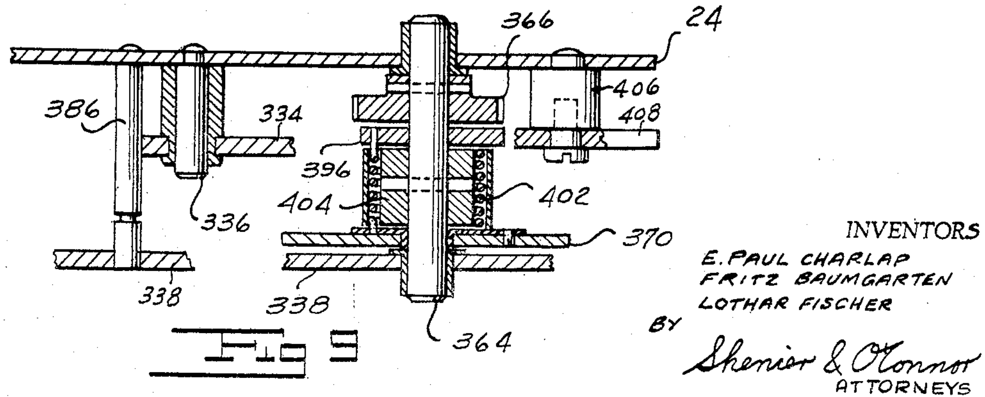
FIGURE 9 is a fragmentary sectional view of the mechanism shown in FIGURE 7 taken along the line 9—9 of FIGURE 7.
Figure 10:
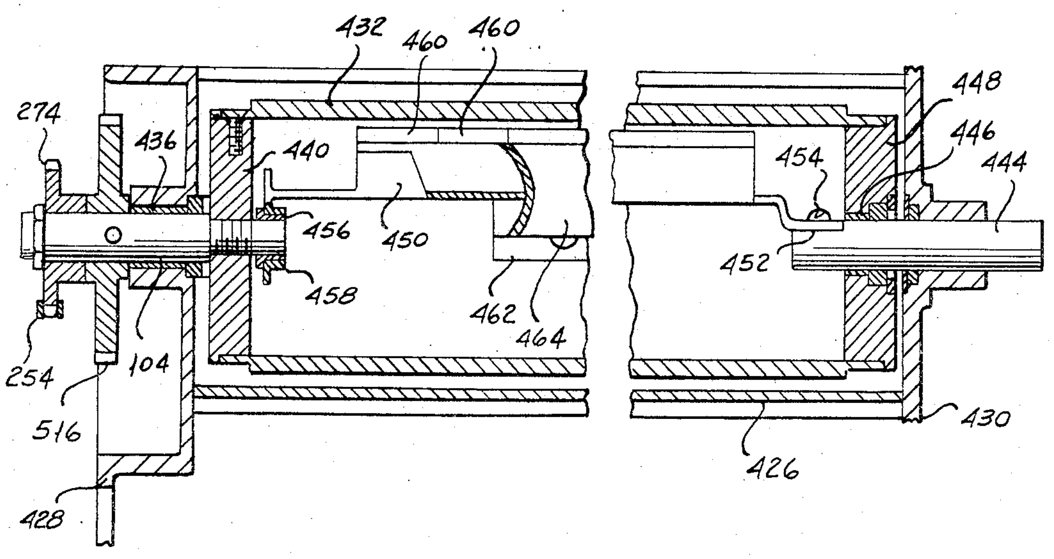
FIGURE 10 is a fragmentary sectional view of a portion of the dry developer system of the form of our copier shown in FIGURE 1.

When the solenoid 328 is energized to move its armature to the right as viewed in FIGURE 7, shoe 342 is moved into engagement with the disc 326 with a predetermined frictional force. Owing to this frictional force, as shaft 60 continues to rotate, it winds the spring 320 to reduce its diameter to bring the spring coils into engagement with the drum 322. As the shaft 60 rotates, it drives the roller 58. This coupling is maintained so long as solenoid 328 remains energized. When the solenoid is de-energized in a manner to be described, a spring 344 on the shaft 336 moves the lever back to its initial position to relieve the spring 320 which then unwinds so that the coupling between the shaft 60 and the roller 58 is released.

When lever 334 pivots in response to energization of solenoid 328, its lower end as viewed in FIGURE 7 moves to the right to permit a switch 844 to close. This operation energizes the exposure lamps and the corona and conditons the toner monitoring circuit in a manner to be described.

The cutter assembly 46 of our machine comprises a stationary knife blade 346 carried by a bar 348 supported on a bracket 350 on side plate 24. Bar 348 also supports a pair of paper guides 352 and 354. A pair of stub shafts 356 and 358 in side plates 22 and 24 carry a rotary knife blade support bar 360. An arm 362 is adapted to be oscillated to move the movable blade 360 past the stationary blade 346 to cut the length of copy material being fed through the machine. As has been explained, this cutting operation is to take place concomitantly with the interruption of the paper feed drive when the entire image of the original has been applied to the copy material. When this occurs, solenoid 328 is de-energized.

A short shaft 364 rotatably supported in the plate 24 and a plate 338 spaced from plate 24 by spacer 340 carries a gear 366 adapted to be driven by a gear 368 on the shaft 70 which is continuously driven by sprocket 252 so long as the machine is on. Shaft 364 rotatably supports a cam 370 having respective bosses 372 and 374 at generally diametrically opposite locations thereon. With the cam 370 at rest, one of the projections 372 or 374 is at a location at which it supports a follower roller 376 carried by a pin 378 on a lever 380 pivotally supported by a pin 382 on the plate 338. A spring 384 connected between the end of lever 380 remote from pin 382 and a pin 386 on plate 338 normally urges the lever 380 to move in a counterclockwise direction as viewed in FIGURE 7 to urge the follower 376 into engagement with cam 370. An actuating pin 388 on lever 380 engages a slot 390 in crank 362.

From the structure just described, it will be apparent that if cam 370 were permitted to move in a counterclockwise direction as viewed in FIGURE 7, the projection or boss 372 would move out from under the follower 376 and spring 384 would move lever 380 downwardly in a counterclockwise direction as viewed in FIGURE 7. This action moves the blade 360 past the blade 346 to cut the length of paper. When this happens, an offset 392 on lever 380 engages a shock-absorbing block 394 on plate 338. Our machine is arranged to cause the operation of lever 380 concomitantly with the interruption of the paper feed drive.

Shaft 364 loosely carries a ratchet wheel 396 provided with a pair of teeth 398 and 400 at locations corresponding generally to the locations of the cam projections 372 and 374. A coil spring 402 surrounding a clutch drum 404 on shaft 364 normally tends to coil itself into engagement with the drum 404. We connect the ends of spring 402 respectively to the ratchet 396 and to the cam 370. If both of these members are free to move, the spring 402 coils around the drum 404 to provide a friction coupling between shaft 364, ratchet 396 and cam 370.

A shaft 406 on the plate 338 pivotally supports a lever 408. A spring 410 on shaft 406 normally urges the lever 408 to a position at which a detent 412 is in engagement with the surface of the ratchet wheel 396. Assuming the detent 412 is out of engagement with one of the teeth 398 and 400, then a friction coupling exists between shaft 364, the wheel 396 and the cam 370. Ultimately, one of the teeth 398 or 400 engages the detent 412 to stop the ratchet wheel. When this occurs, the direction of rotation of shaft 364 is such as causes spring 402 to unwind to relieve the driving connection between the shaft and the cam 370.

A pin 414 on the lever 408 pivotally supports a trigger 416 which is normally urged by a spring 418 connected between the trigger and lever 408 to rotate in a counterclockwise direction as viewed in FIGURE 7 until a stop 420 on the trigger engages the lever.

When as has been described solenoid 328 is energized to initiate a copy paper feeding operation, lever 334 rotates in a counterclockwise direction to engage the shoe 342 with the disc 326. In the course of this movement of the lever, a finger 422 on lever 334 engages a projection 424 on the upper end of trigger 416. Owing to the direction of action of sprnig 418, finger 422 merely rides by the projection. On the return trip, however, when solenoid 328 is de-energized, finger 422 engages projection 424 to pivot lever 408 in a counterclockwise direction to move detent 412 out of engagement with ratchet wheel tooth 398 or 400 to free the ratchet wheel to permit spring 402 to engage drum 404 to cause wheel 396 and cam 370 to rotate with shaft 364. When this occurs a boss, such as boss 372, moves out from under follower 376. Spring 384 actuates lever 380 and pin 388 actuates crank 362 to drive the movable cutter bar 360 to cut the length of copy material. Shaft 364 continues to rotate until detent 412 engages tooth 398 to uncouple the shaft. At this time the movable cutter has been reset by the other boss 374.

Referring now to FIGURES 1 to 3 and 10 to 16, as the copy material leaves the rollers 66 and 68, it passes through the space between corona wire 82 and ground roller 88 and receives an electrostatic charge. It then advances through rollers 74 and 76 and over window 92 through which an image of the original is projected onto the copy paper. It loses its charge over the relatively lighter areas of the image and retains the charge over the relatively darker areas before it is fed by rollers 96 and 98 into the developer zone 52 of the machine.

In one form of our copy machine we employ a dry developer system comprising a tray 426 supported between developer assembly side plates 428 and 430 carried by the main side plates 22 and 24 of the frame. We dispose a developer roller 432 having a serrated surface 434 for rotary movement in the tray 426. A bushing 436 supported in the plate 428 rotatably carries the shaft 104. We secure an end plate 440 of the toner roller 432 to shaft 104 for rotation therewith so that when the shaft 104 is driven in a manner to be described, the toner roller 432 is driven. A stationary shaft 44 mounted in the side plate 430 carries a bushing 446 which rotatably supports the other end plate 448 of the roller 432.

One end of a magnet support bracket 450 carries a lug 452 which we secure to the shaft 444 by any suitable means, such as by a screw 454. A bushing 456 on a portion of the shaft 104 extending inwardly beyond the plate 440 receives a boss 458 on the bracket 450. We dispose a plurality of magnets 460 along the length of the bracket 450. The brackets 450 carries a pair of spaced shield mounting brackets 462 to which we secure a shield 464 by any suitable means, such as screws 466.

From the structure just described, it will be apparent that the magnet and shield assembly is stationary while the developer roller 432 will rotate in response to rotation of the shaft 104.

As will be described in detail hereinafter, in the dry developer form of our machine, tray 426 normally holds a supply of a mixture of a magnetic material such, for example, as iron filings and a toner which may, for example, be a suitably colored resin adapted to be attracted to the charged areas on the copy material and thereafter fused to the copy material by the application of heat. In order to ensure that the mixture of the carrier particles and the toner particles is as uniform as is possible, we rotatably mount a pair of agitators 468 and 470 in the side plates 428 and 430. These agitators are constantly driven to mix the toner particles with the particles of carrier material. We mount a toner supply housing 472 outboard of the side plate 430 by any suitable means such, for example, as by a screw 474 secured to an extension 476 of the tray 426 into which both of the agitators 468 and 470 extend. Housing 472 carries a shaft 478 which supports an agitator 480 which, in response to rotation of shaft 478, stirs the toner particles within the container 472. We provide the toner adder assembly with a gate 482 normally urged closed by a spring 484 secured to the side plate 430. When in a manner to be described hereinafter, the supply of toner in the dry developer has become depleted, a signal is fed to a solenoid 486 to energize the solenoid to draw its armature 488 to the right as viewed in FIGURE 13 to permit toner to drop through the bottom of housing 472 into the extension 476 from which it is moved by the agitators 468 and 470 into the tray 426 adjacent the toner roller 432.

Figure 13:
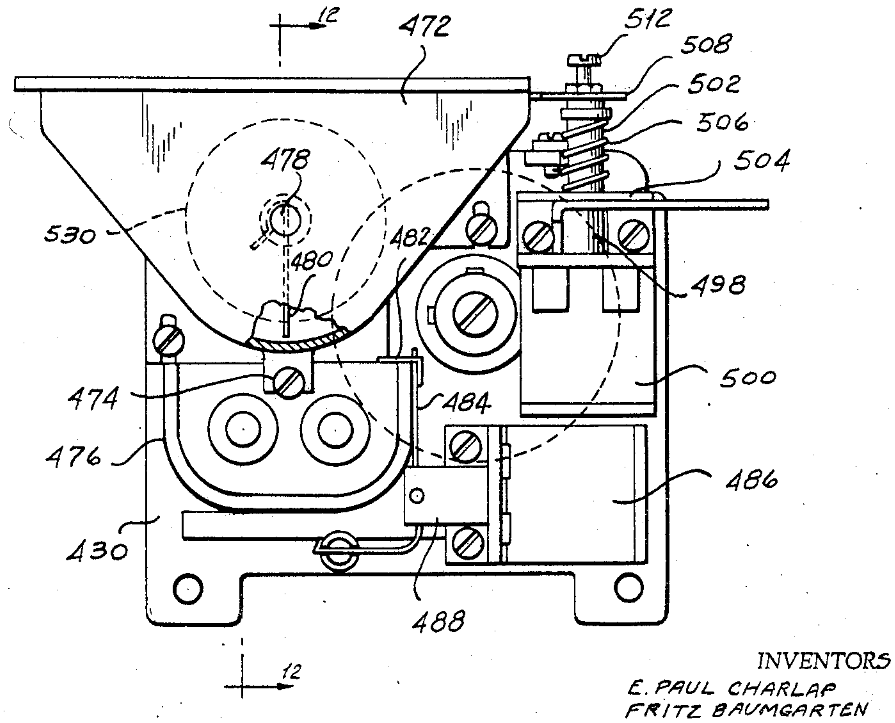
FIGURE 13 is an end elevation of the dry developer system illustrated in FIGURE 12.
Figure 14:
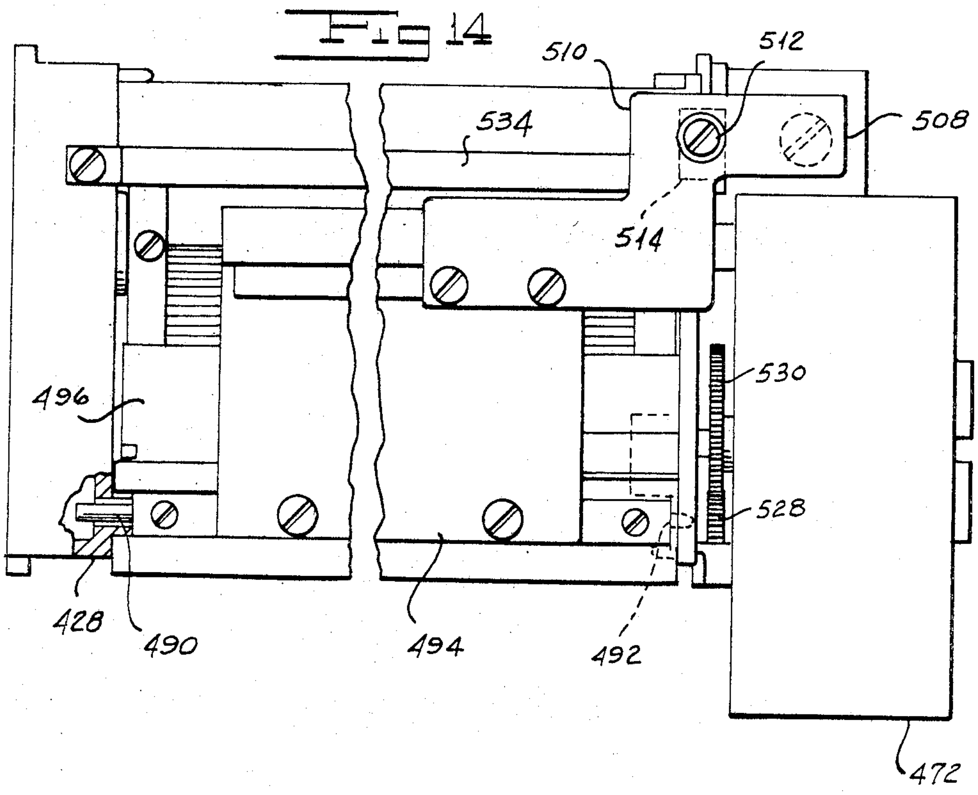
FIGURE 14 is a top plan view of the dry developer system shown in FIGURE 12 with parts broken away and with other parts shown in section.
Figure 15:
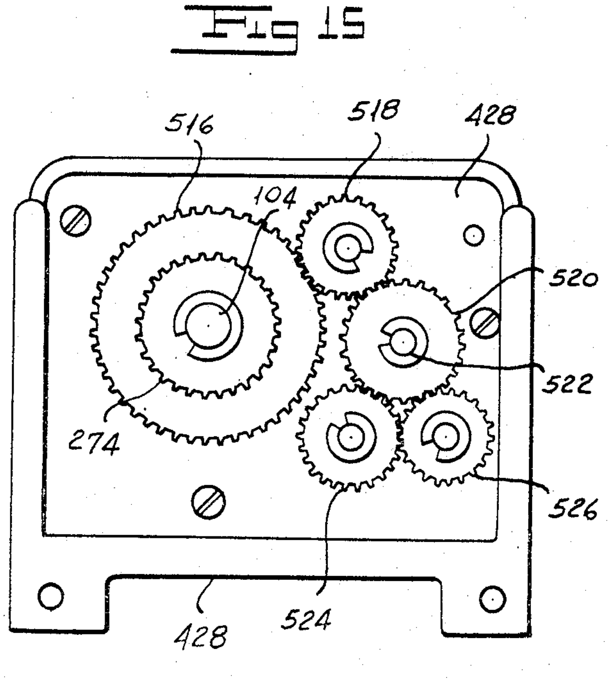
FIGURE 15 is an end elevation of the dry developer system shown in FIGURE 14.
Figure 16:
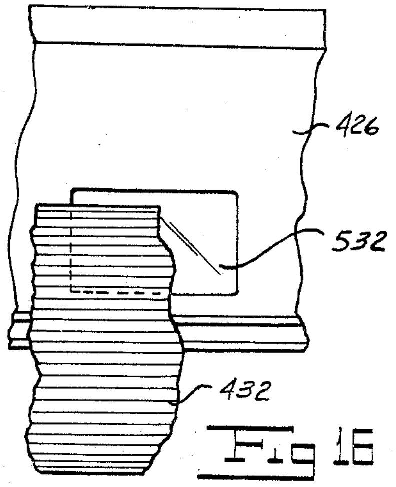
FIGURE 16 is a fragmentary plan view of the dry developer system shown in FIGURE 12.

A pair of pivot shafts 490 and 492 pivotally support a clapper 494 on the side plates 428 and 430. We dispose a paper guide 496 below the clapper 494 ahead of the toner roller 432 in the direction of movement of the copy paper. The armature 498 of a solenoid 500 carries a screw 502 which extends upwardly through a bracket 504. A spring 506 on the screw bears between the bracket 504 and the head of the screw normally to urge the armature 498 to its uppermost limit position as shown in FIGURE 13. In this position of the screw, a lateral extension 508 on an arm 510 carried by the clapper 494 rests on the head of the screw 502. When a sheet of copy material is fed into the space between the guide 496 and clapper 494, solenoid 500 is energized to move the screw 502 downwardly to permit clapper 494 to fall under the influence of gravity toward the paper being fed to ensure contact between the paper and the material carried by the roller 432. An adjustable screw 512 on arm 510 is adapted to engage a strike plate 514 to limit the downward movement of the clapper.

As has been explained hereinabove, the drive mechanism of our machine comprises the chain 254 which drives a sprocket wheel 274 on shaft 104. Shaft 104 carries a toner roller drive gear 516 which drives an idler gear 518 carried by side wall 428. Gear 518 drives a gear 520 carried by the toner adder drive shaft 522 which is rotatably supported in the plates 428 and 430. Gear 520 engages respective gears 524 and 526 to rotate the agitators 468 and 470.

The end of shaft 522 outboard of plate 430 carries a gear 528 which meshes with the gear 530 carried by the shaft 478 of the toner supply. Thus, as the gear 516 rotates, agitator 480 is driven to stir the toner particles within the housing 472. It is to be noted that we provide a window 532 in the underside of the tray 426 to permit the dry developer to be monitored to determine when toner should be added in a manner to be described hereinbelow.

We provide our assembly with an iron rod 534 disposed just over the adder as it moves onto the toner roller. This rod is in the fringe of the magnetic field produced by the toner magnets. It collects any stray particles to prevent them from falling onto the copy material as it moves through the developer system.

We provide our machine with a counter mechanism for producing an output pulse after a predetermined number of copies have been made. As will be explained hereinbelow, this counter mechanism pulse is a demand pulse for enabling the toner adder system each time a certain number of copies has been made.

Figure 17:
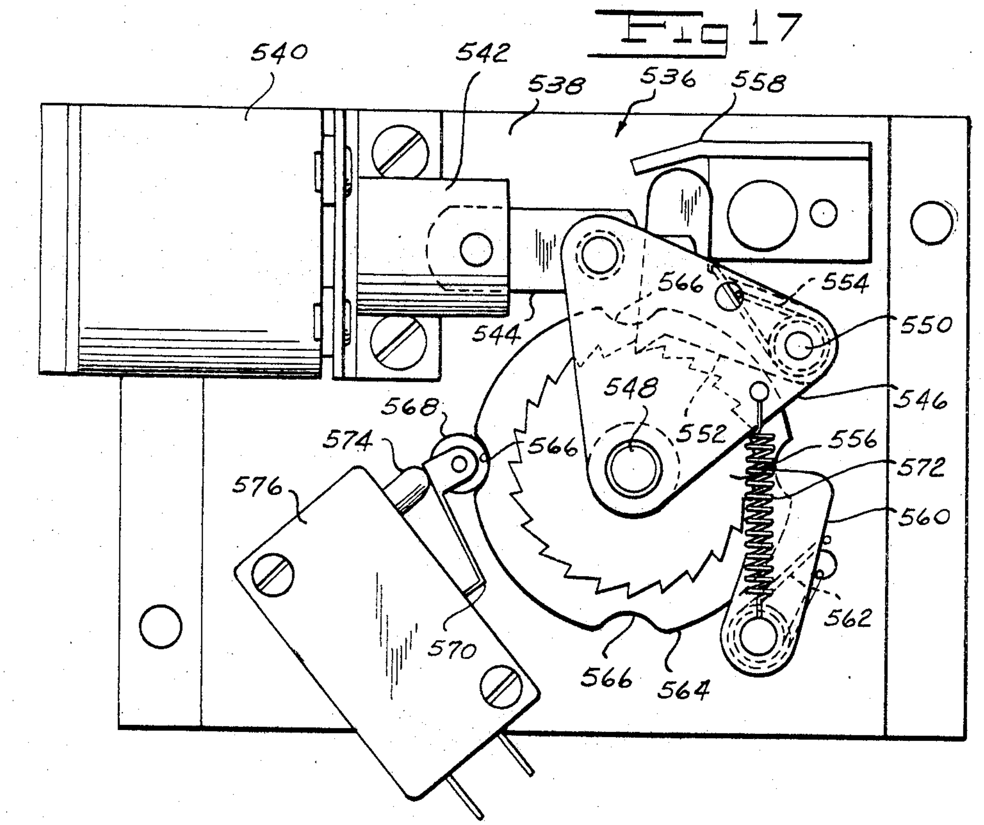
FIGURE 17 is a side elevation of a counter mechanism employed in our improved electrostatic copier.
Figure 18:
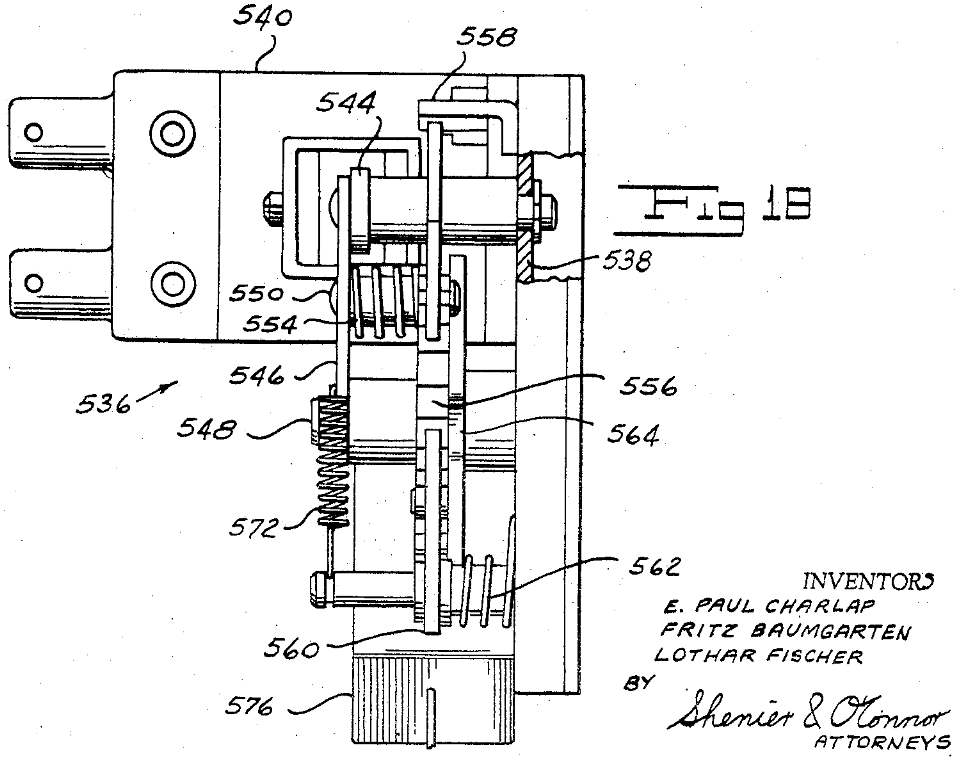
FIGURE 18 is a plan view of the counter shown in FIGURE 17.
Figures 19, 20, 21, 22:
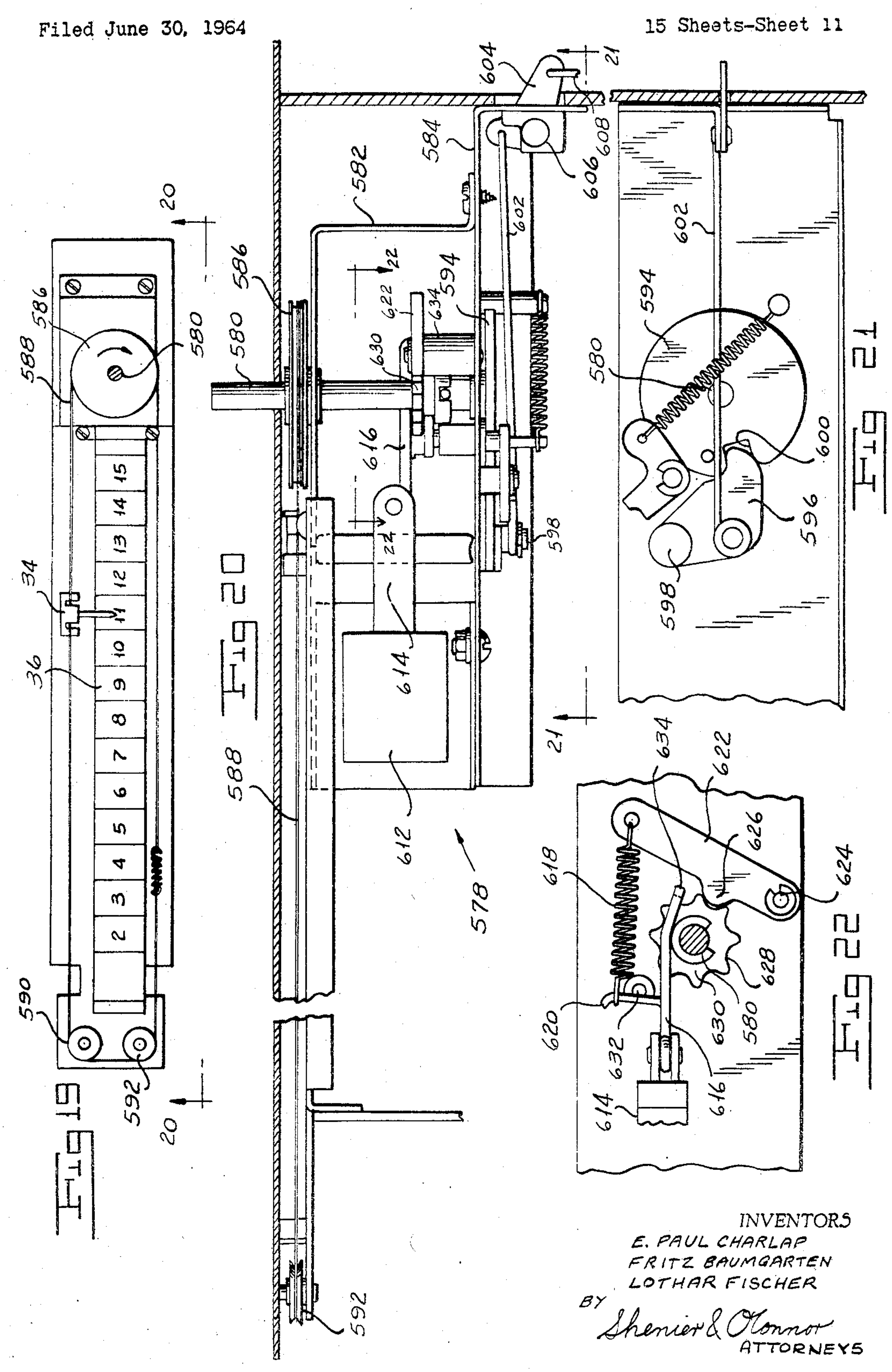
FIGURE 19 is a top plan view illustrating the indicator of one form of repeat copy mechanism which may be employed in our improved electrostatic copier.
FIGURE 20 is a side elevation of the form of repeat copy mechanism shown in FIGURE 19 taken along the line 20—20 of FIGURE 19 and drawn on an enlarged scale.
FIGURE 21 is a bottom plan view of the repeat copy mechanism shown in FIGURE 20 taken along the line 21—21 of FIGURE 20.
FIGURE 22 is a fragmentary sectional view of a portion of the repeat copy mechanism shown in FIGURE 20 taken along the line 22—22 of FIGURE 20.

Referring now to FIGURES 17 and 18, our counter mechanism indicated generally by the reference character 536 comprises a plate 538 mounted at any suitable location on the machine such, for example, as on the plate 24. In a manner to be described hereinafter, a solenoid 540 receives an electrical impulse each time a copy is made on the machine. Solenoid 540 has an armature 542 connected by a link 544 to a bell crank 546 loosely supported on a shaft 548 carried by plate 538. In response to energization of the solenoid 540, plate 546 is oscillated once for each copy. A pin 550 on crank plate 546 supports a first pawl 552 which is normally urged by a spring 554 into engagement with a ratchet wheel 556 carried by shaft 548 for rotation therewith. A stop plate 558 on the support 538 ensures that the pawl 552 engages the wheel 556 to step the wheel as the solenoid actuates the crank 546. We provide our counter assembly with a locating pawl 560 normally urged by a spring 562 into engagement with the wheel 556.

Shaft 548 also carries for rotation therewith a cam plate 564 having recesses 566 into which a follower roller 568 supported by a spring 570 is adapted to ride. A spring 572 normally tends to urge the plate 546 to rotate in a clockwise direction to return armature 542 to its normal position following actuation.

We so construct our counter mechanism that there are a predetermined number such, for example, as six ratchet wheel teeth over the arcuate distance between a pair of successive recesses 566 on the plate 564. In response to the first energization of the solenoid 540, plate 564 is moved through one step in a counterclockwise direction to drive the follower 568 out of a recess against the action of spring 570. As it moves out of the recess, the follower 568 operates the actuating element 574 of a normally closed switch 576. The follower 568 remains out of a recess 566 until the sixth energization of solenoid 540 at which time it drops back into the recess. It will thus be apparent that our counter mechanism produces a pulse each sixth copy in the particular form of the counter shown in the drawings.

Referring now to FIGURES 4 and 19 to 22, our machine is provided with a repeat copy mechanism indicated generally by the reference character 578 supported just above the original transport mechanism of the machine. In response to the operation of knob 32, a shaft 580 is rotated in a clockwise direction to set the machine to make a predetermined number of copies. Shaft 580, which is rotatably mounted in a bracket 582 carried by a supporting frame 584, drives a pulley 586 adapted to actuate an endless cord 588 formed of a suitable material such as nylon or the like. Cord 588 rides around a pair of idler pulleys 590 and 592 and carries the pointer 34 which cooperates with the scale 36. Shaft 580 extends downwardly through the frame 584 and carries for rotation therewith a counter cam 594 which cooperates with a detent 596 pivotally supported on a pin 598.

In the normal position of the parts wherein a single copy is to be made, detent 596 rests in a recess 600 in the cam plate 594. When the knob 32 is turned in a clockwise direction, as viewed in FIGURE 19, detent 596 moves out of the recess 600 and in the course of this movement rotates in a clockwise direction as viewed in FIGURE 19. When this occurs, the detent moves a link 602 to the left as viewed in FIGURES 20 and 21 to pivot a bell crank 604 carried by a pin 606 in a counterclockwise direction as viewed in FIGURE 20. When the bell crank 604 moves in this direction, it pulls a rod 608 upwardly as viewed in FIGURES 4 and 20. Rod 608 is connected to a tab 610 on gate 216 to move the gate 216 to the broken line position shown in FIGURE 4 so that the original is recycled in the manner described above.

We provide our machine with means for stepping the plate 594 through one step as each copy is made so that when the number of copies for which the plate has been set have been made, the detent 596 drops back into its recess, gate 216 moves back to its full line position and the original is returned. A solenoid 612 carried by the support 584 receives a pulse each time a copy is made to draw its armature 614 to the left as viewed in FIGURE 20.

We connect a driving link 616 to the armature 614 for movement therewith. A spring 618 connected between an arm 620 and one end of a locating lever 622 normally draws these members together. Lever 622 is pivoted on a pin 624 carried by the support 584 and it has a detent 626 adapted to engage a recess 628 in a wheel 630 on the shaft 580. Arm 620 normally engages a stop pin 632 on the support 584. It will thus be seen that the normal action of spring 618 is to urge the arm 620 into engagement with the stop pin 632 and to urge the detent 626 into engagement with a recess 628 on the lever 622. We provide the link 616 with a finger 634 adapted to engage one of the teeth of the wheel 630 in response to energization of the solenoid. When the solenoid 612 is energized, it moves its armature 614 and the link 616 to the left as viewed in FIGURES 20 and 22. During the initial portion of this movement and before the finger 634 engages wheel 630, spring 618 is tensioned. During the terminal portion of the movement of armature 614, finger 634 positively engages the wheel 630 and moves it a distance sufficient to cause a tooth of the wheel to ride over the detent 626. Now, whether or not the solenoid is immediately de-energized, the detent 626 will ride into the next recess under the action of the spring 618 until the parts have returned to their initial positions. This action continues until the plate 594 is moved through a distance corresponding to the number of copies for which the machine has been set.

Figure 23:
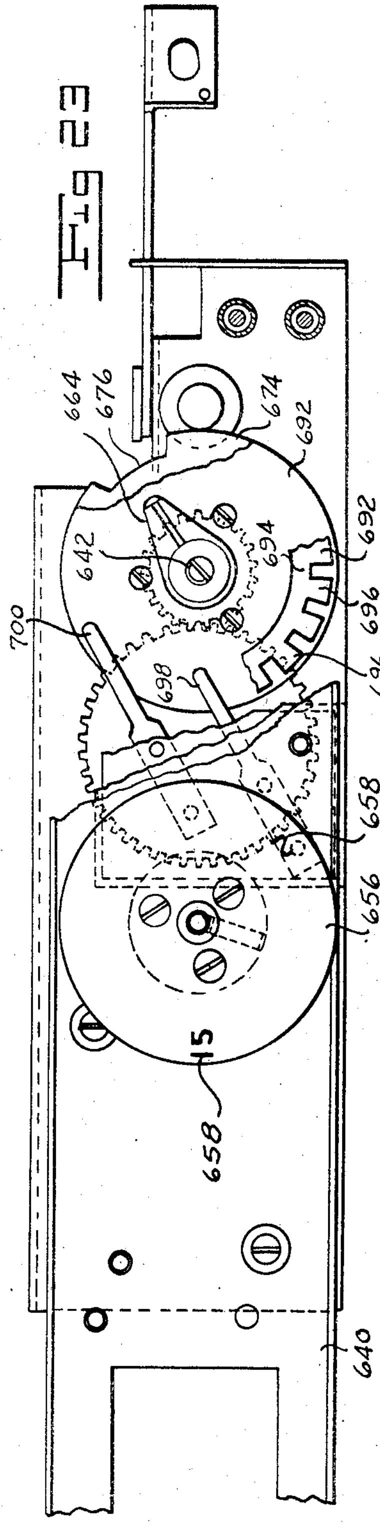
FIGURE 23 is a top plan view of an alternate form of repeat copy mechanism which may be employed in our improved electrostatic copier.
Figure 24:
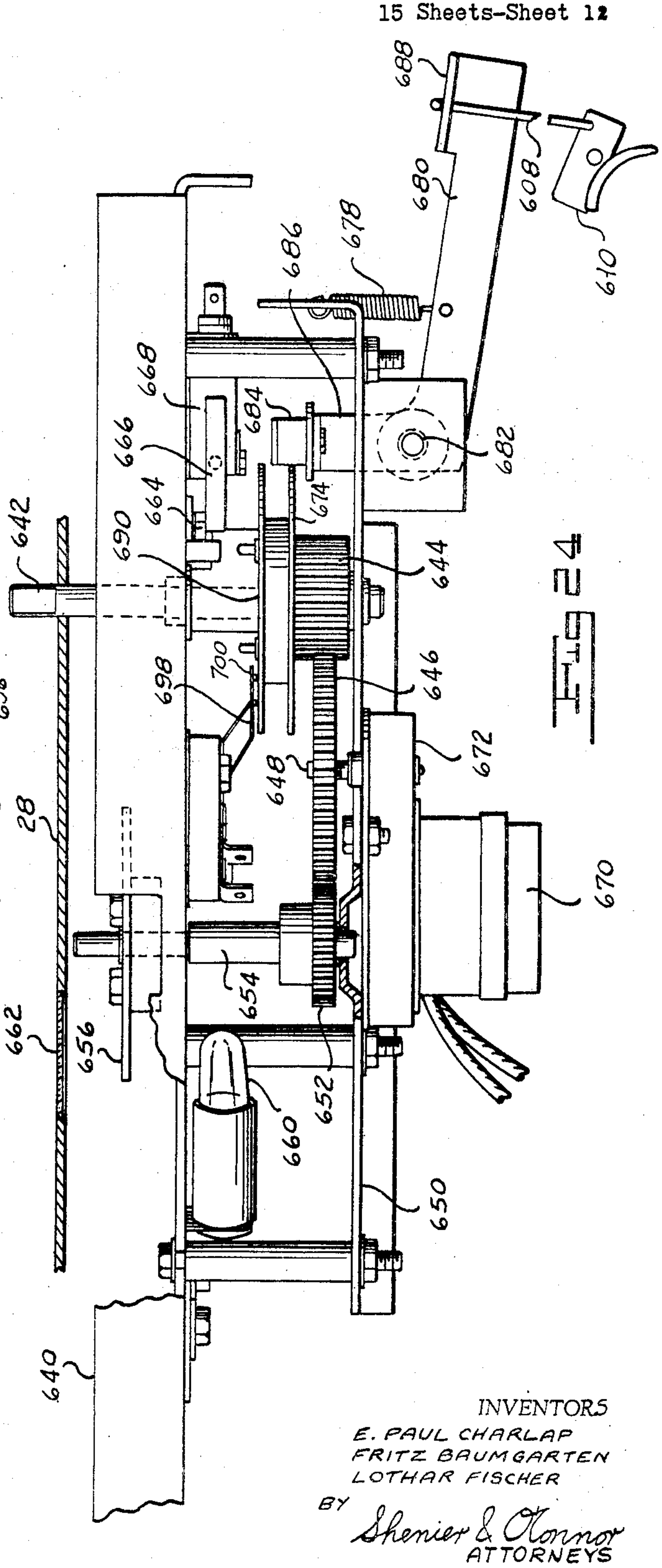
FIGURE 24 is a side elevation of the form of repeat copy mechanism shown in FIGURE 23.
Figures 25, 28, 29:
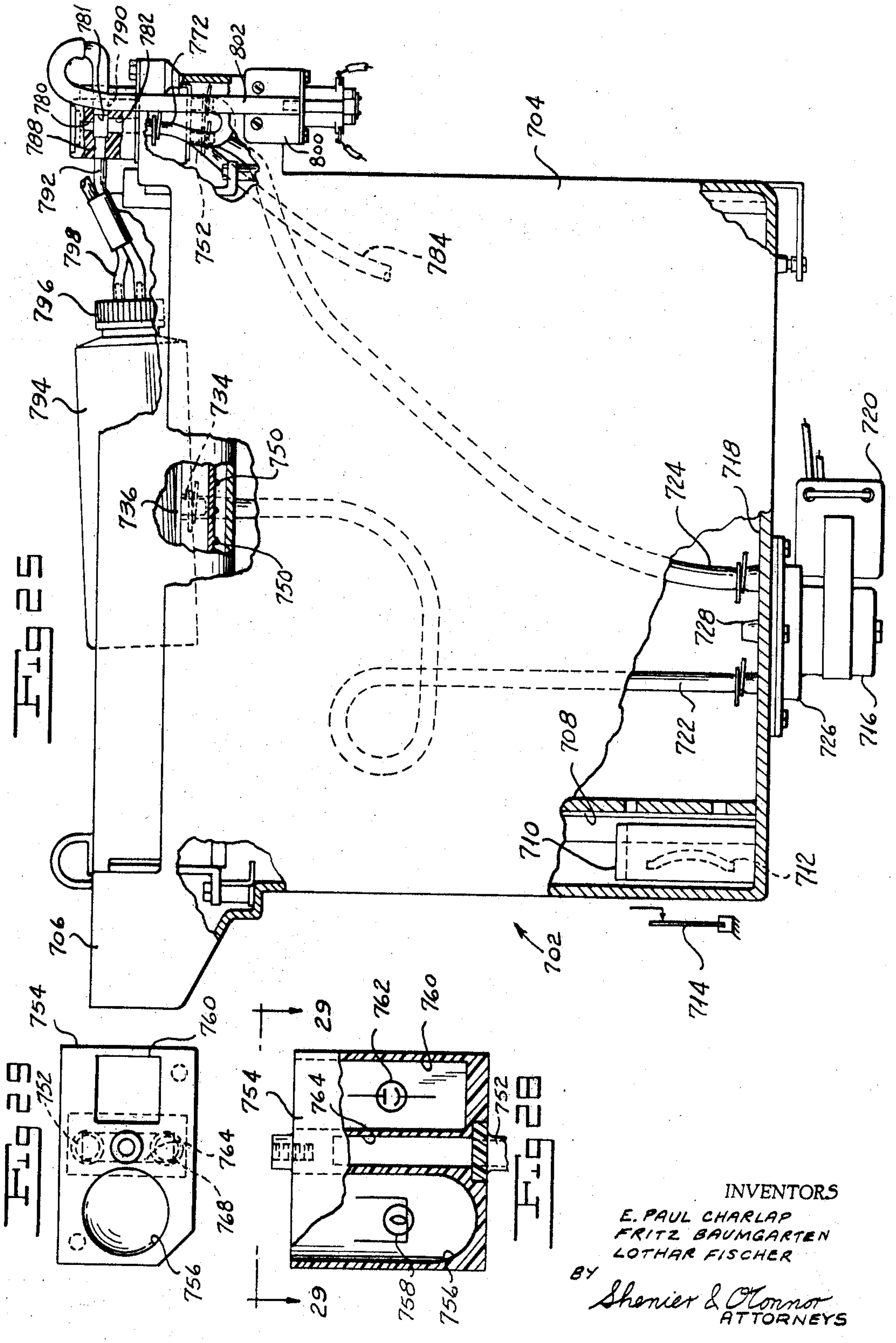
FIGURE 25 is a side elevation of a wet developer system which can be employed in our improved electrostatic copier with parts broken away and with other parts shown in section.
FIGURE 28 is a side elevation of a monitoring element of the toner replenishing system shown in FIGURE 27 with a part broken away.
FIGURE 29 is a top plan view of the monitoring element shown in FIGURE 28 taken along the line 29—29 of FIGURE 28.
Figure 26:
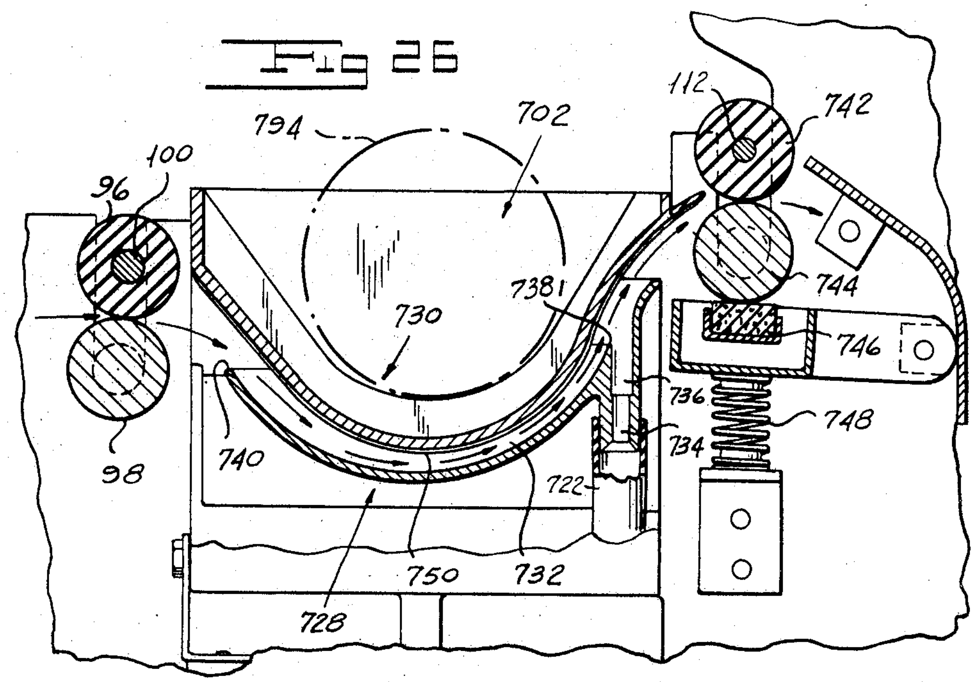
FIGURE 26 is a fragmentary sectional view of the wet developer system shown in FIGURE 25.
Figure 27:
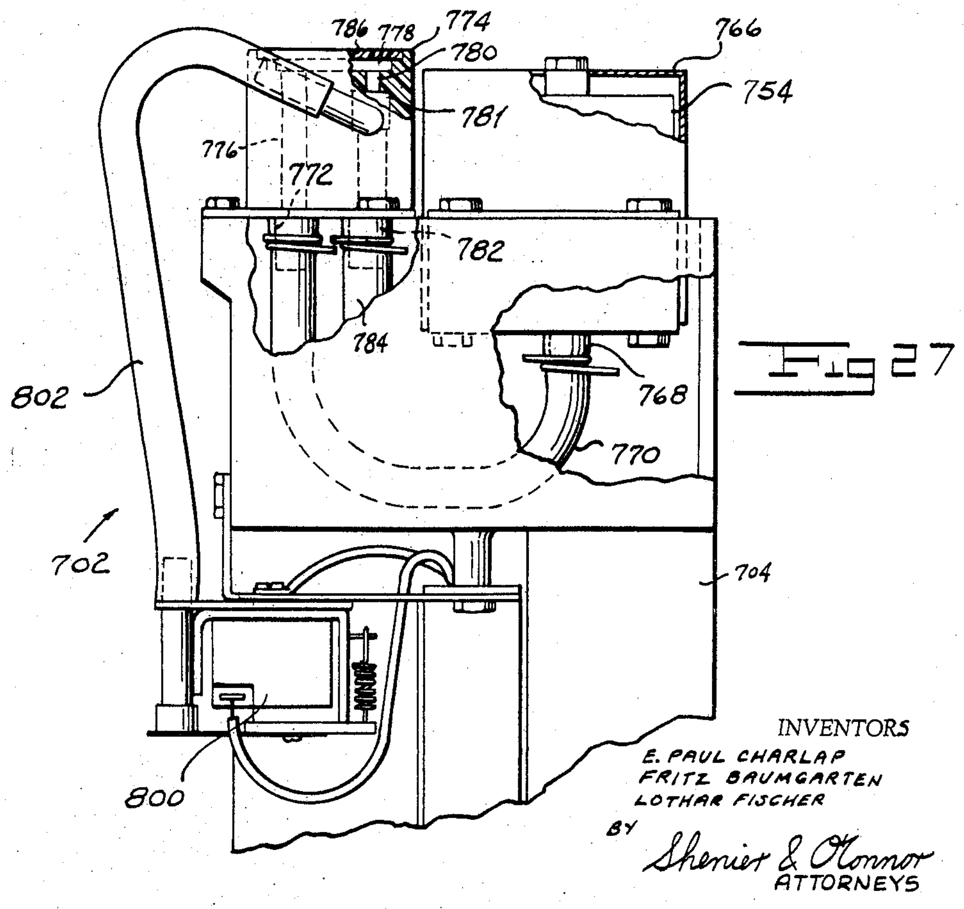
FIGURE 27 is a side elevation of the toner replenishing system of the wet developer system shown in FIGURE 25 with parts broken away and with other parts shown in section.

Referring now to FIGURES 4, 23 and 24, we have shown an alternate form of our repeat copy mechanism comprising a support bracket 640 adapted to be mounted on the front assembly 26 of the machine below the top 28. The mechanism comprises a shaft 642 rotatably supported on the bracket 640 and extending upwardly through the top 28 to receive a knob such as the knob 32. Shaft 642 carries for rotation therewith a gear 644 adapted to drive a gear 646 supported on a shaft 648 carried by a bracket 650 secured to bracket 640 in spaced relationship thereto. Gear 646 engages a gear 652 carried by a shaft 654, the upper end of which supports a disc 656 for rotation therewith.

We apply to the disc 656 a plurality of legends 658 indicating the number of repeat copies for which the machine has been set. A bulb 660 disposed below the disc 656 is illuminated in a manner to be described when multiplied copies are to be made to project the number immediately above the bulb onto a suitable screen 662 in the top 28. Shaft 642 carries for rotation therewith an arm 664 which is adapted to engage the actuating element 666 of a switch 668 to open the switch when no repeat copies are to be made. When it is desired to make repeat copies, shaft 642 is turned in a clockwise direction as viewed in FIGURE 23 until the number of repeat copies desired appears on the screen 662. As shown, the mechanism is set for the maximum number of copies which can be made.

The initial movement of the shaft 642 from the single copy position moves arm 664 out of engagement with element 666 to permit switch 668 to close which, as will be apparent from the description given hereinafter, illuminates bulb 660 and conditions the circuit of a motor 670 to be energized. When energized, motor 670 drives shaft 648 through a friction clutch 672. This friction clutch permits shaft 642 to be turned manually to set the apparatus in the manner described hereinabove. Shaft 642 also carries for rotation therewith a cam disc 674 provided with a slot 676. We connect a spring 678 between bracket 650 and a bell crank arm 680 rotatably supported on a shaft 682. Spring 678 normally urges crank 680 to rotate in a counterclockwise direction on shaft 682 as viewed in FIGURE 24 to urge a follower 684 on the other arm 686 into engagement with the cam 674.

In the normal position of the parts, when no repeat copies are to be made, follower 684 rests in the slot 676.

When it is desired to make repeat copies, shaft 642 is manually turned in a clockwise direction to urge follower 684 out of the slot 676. Owing to this arrangement, arm 680 moves downwardly as the follower 684 moves out of the slot 676. We connect the rod 608 to an offset 688 on arm 680. It will be apparent that the arrangement shown in FIGURES 23 and 24 differs from that shown in FIGURES 19 to 22 in that arm 680 moves downwardly when repeat copies are to be made whereas arm 604 of the form of our repeat copy mechanism shown in FIGURES 19 to 22 moves upwardly when repeat copies are to be made. Thus, in the form of our repeat copy mechanism illustrated in FIGURES 23 and 24, we connect the lower end of rod 608 to the member 610 so that with follower 684 in the recess 676, the baffle 216 occupies the full line position shown in FIGURE 4 and as the follower is moved out of the recess so that arm 680 moves downwardly as viewed in FIGURE 24, the baffle 216 will be pivoted in a clockwise direction to the broken line position shown in FIGURE 4.

From the structure just described, it will be apparent that when shaft 642 is rotated to set the mechanism to make multiple copies, arm 664 permits switch 668 to close, disc 656 is rotated to position the correct legend corresponding to the desired number of copies below screen 662 and follower 684 is moved out of recess 676 to move baffle 216 to its broken line position to recycle the original. Shaft 642 carries for rotation therewith a printed circuit disc 690 having a pattern 692 of conductive material on the upper surface thereof. Pattern 692 comprises a continuous ring 694 of conductive material and a plurality of segments 696 extending outwardly from the ring. Ring 694 and teeth 696 are engaged respectively by a brush 698 and by a brush 700.

After the mechanism has been set to make repeat copies, brush 700 is moved into engagement with an intersegmental nonconductive space while brush 698 engages the continuous ring 694. When switch 668 closes, it lights lamp 660 and conditions the circuit of motor 670 to operate. As a copy is made in the manner described hereinabove, a pulse is produced which is fed to the motor 670. This pulse initiates motor movement to drive gear 646 through clutch 672. Gear 646 drives gear 644 to move the printed circuit disc 690 to a position at which brush 700 engages a segment or tooth 696. This tooth holds the motor circuit until brush 700 engages the next intersegmental space to interrupt the motor circuit. It will readily be appreciated that in this manner steps of rotation of the motor 670 are provided. These steps continue until follower 684 drops into recess 686 to reset gate or baffle 216, arm 664 engages element 666 to disable the repeat copy mechanism and disc 656 has been positioned to its condition wherein no repeat copies are made. The electrical connections for producing this operation will be more fully apparent from the description of our electrical control circuit given hereinbelow.

Referring now to FIGURES 25 to 29, we have shown a form of our machine in which a wet developing system, indicated generally by the reference character 702, is used in place of the dry developer system, indicated generally by the reference character 52 in FIGURE 1. As will be apparent from the description hereinbelow, the wet developer system 702 may readily be interchanged with the dry developer system 52. The liquid developer system includes a tank 704 adapted to contain a supply of a suitable liquid developer comprising a carrier having particles of toner material suspended therein. An inlet passage 706 at the top of the tank permits additional carrier to be poured into the tank in the event that the supply of carrier is depleted through evaporation or the like. A chamber 708 at one side of the tank to which fluid is admitted receives a float 710 carrying a magnet 712 adapted to influence a reed switch 714 outside the tank. It will readily be apparent that when the float 710 reaches a predetermined low level within the chamber 708, thus indicating that the supply of developer is at a predetermined low level, then the magnet 712 actuates switch 714 to light a lamp in a manner to be described hereinbelow to indicate that the supply of developer is too low.

We mount a pump 716 on the base 718 of the tank 704. A motor 720 is adapted to be energized to drive the pump to supply liquid developer to respective lines 722 and 724 connected to fittings leading to the impeller chamber 726 of the pump. A fitting 728' extending above the base 718 of the tank permits liuid to flow into the pump.

We provide our liquid developer system with a trough, indicated generally by the reference character 728, adapted to be mounted on the top of the tank 704. This trough 728 receives an upper guide, indicated generally by the reference character 730, to provide a space 732 between the guide and the trough through which copy paper carrying a latent electrostatic image can pass and be subjected to the action of the liquid developer.

We connect the tubing or pipe 722 to a fitting 734 leading into a distribution channel 736 extending from side-to-side of the trough. When pump 716 is being driven, developer supplied to the line 722 is fed up into the distribution channel and flows over an edge 738 of the channel into the space 732. It fills up this space 732 between the upper guide 730 and the trough 728 until the excess flows over an edge 740 at the front of the trough and returns to the tank 704. It will thus be apparent that the space 732 is supplied with developer liquid to a predetermined level.

A length of copy material passing through the machine is fed by rolls 98 and 96 into the space 732 and travels through the space and upwardly to sueeze rolls 742 and 744, the upper roll 742 of which is formed from rubber or the like and the lower roll of which is formed from metal. A wiper 746 is normally urged by a spring 748 into engagement with the roll 744 to remove moisture therefrom. From the rolls 742 and 744 the sheet of copy material passes to the section 54 which, in the liquid developer form of our machine, serves to dry the copy. It will readily be apparent that roller 742 may be carried by the driven shaft 112. It will be noted that we provide the upper guide with a plurality of ribs 750 on the underside thereof to facilitate passage of the copy material through the space 732.

We provide both forms of our machine with means for monitoring the developer to ensure that the correct proportion of toner to developer exists and with means for replenishing the toner automatically as it is depleted in the course of making copies. In the liquid form of the machine, we connect the tube or pipe 724, which supplies liquid developer from the tank so long as pump 716 is driven, to one inlet 752 of a monitoring block 754 formed, for example, from a clear plastic resin. We form block 754 with a recess 756 for receiving a lamp 758 and with a recess 760 which receives a photocell 762. Passage 752 leads into a chamber 764 provided in the block between the chambers 756 and 760. It will readily be apparent that light from the lamp 758 passes through the walls defining the chamber 764 to the photocell 762. In so doing, it also passes through the liquid developer within the chamber 764. Consequently, if the liquid developer is too light or in other words has too little toner therein, photocell 762 will develop an output signal at a predetermined level, which as will be described hereinafter actuates the replenishing assembly.

We provide the block 754 with a cover 766 to shield the block from extraneous light. Block 754 has an outlet passage 768 which we connect by a hose 770 to one inlet 772 of an injector or jet pump body 774. The inlet 772 leads to a passage 776 entering into a recess 778. A flow restricting passage 780 leads to a space 781. An outlet passage 782 is connected back to the tank by a tube 784. Cover plate 786 closes the recess 778 so that liquid coming in through fitting 772 travels through passage 776, through the space 778 and outwardly through passage 780, space 781 and outlet 782 back to the tank.

We form the body 774 with respective passages 788 and 790 leading into space 781 from opposite sides thereof. A tube 792 connects the passage 788 to the interior of the toner bottle 794 through the bottle cap 796. Conveniently, the bottle 794 may rest within the upper guide 730 with the level of toner in the bottle below passage 780. Another tube 798 connects the interior of the bottle 794 to the atmosphere through the cap. We connect the passage 790 to a normally open air valve assembly 800 by a tube 802. Valve 800 is adapted to be actuated in response to an electrical signal in a manner known to the art to close valve 800.

From the structure just described, it will readily be apparent that under normal conditions when the liquid within tank 704 contains sufficient toner, photocell 762 produces no effective output signal. At the same time valve 800 is open and the liquid passing through the injector body 774 merely is returned to the tank. If, however, the liquid developer becomes too light indicating that toner should be added, then photocell 762 produces an output signal, which in a manner to be described hereinafter is fed to the valve 800 to actuate the valve to close passage 790. When this occurs, a Venturi effect causes toner to be drawn from the bottle 794 into the passage 788 and thence to the space 781 wherein it mixes with the developer until the system has sufficient toner. It is to be understood, of course, that the operation just described can take place only if a signal has been produced by the counter mechanism to actuate switch 576 to indicate that the developer should be checked for quantity of toner.

Figure 30:
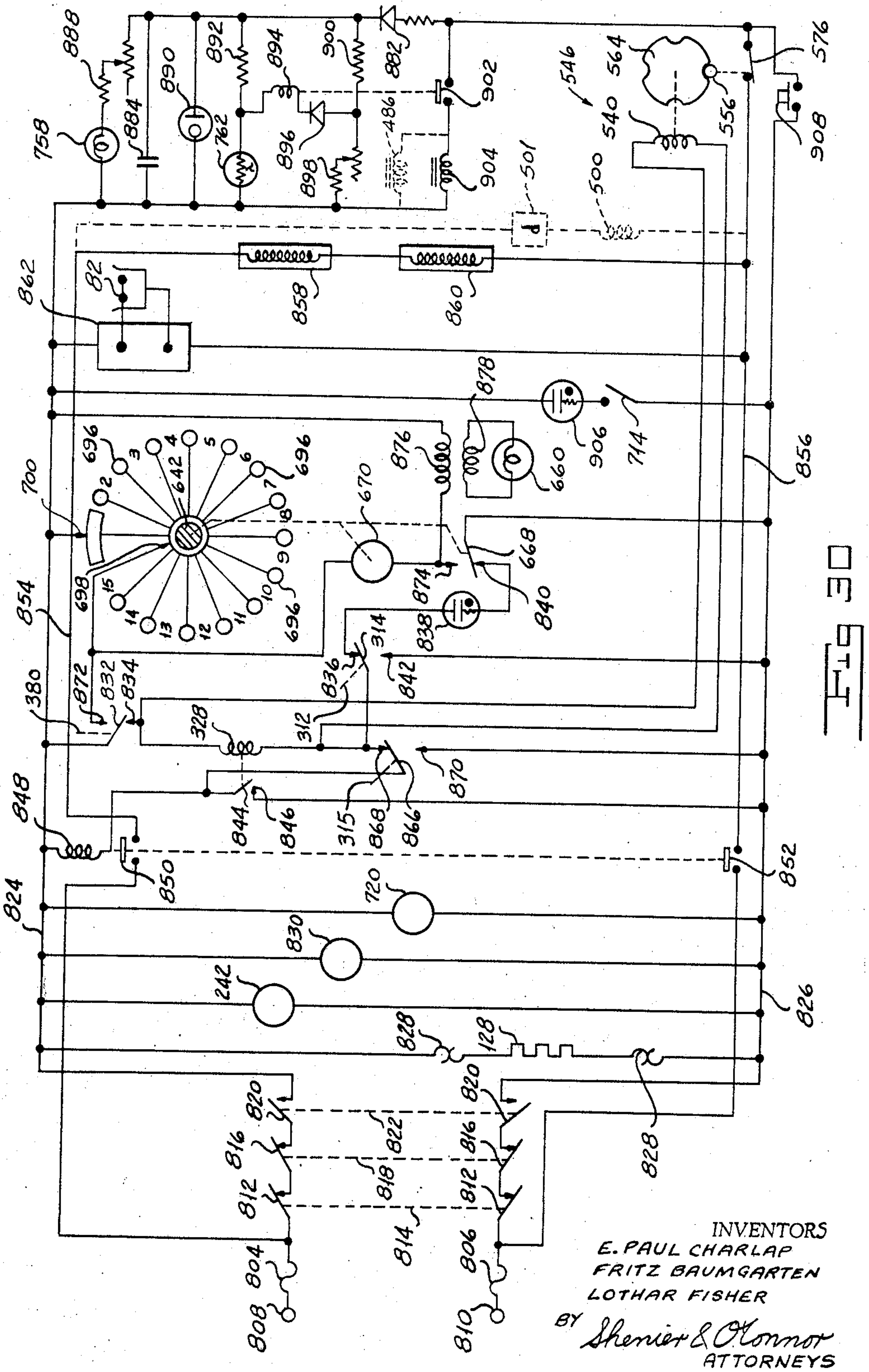
FIGURE 30 is a schematic view of one form of electrical control circuit which can be used on our improved electrostatic copier.

Referring now to FIGURE 30, we have shown one form of electrical control circuit which can be used to control the operation of our copier. The particular circuit illustrated in FIGURE 30 is for use with the liquid toner form of our machine discussed above. Respective fuses 804 and 806 connect our circuit to the terminals 808 and 810 of a suitable source of electrical power such, for example, as the usual 110 volt 60 cycle alternating current. Respective rear interlock switches 812 ganged by a connection 814 and lid interlock switches 816 ganged by a connection 818 connect the fuses 804 and 806 to on-off power switches 820 ganged by a connection 822. Thus, the fuses 804 and 806 together with the switches 812, 816 and 820 connect terminals 808 and 810 to main control circuit conductors 824 and 826. It will readily be appreciated that in the normal condition of our circuit before the machine is set for operation, the rear door and lid are closed so that switches 812 and 816 are closed but the power switches 820 are open.

In order to condition our machine for operation, we close switches 820 to apply power to lines 824 and 826. We connect the heater 128 across lines 824 and 826 by thermostats 828. We connect the main drive motor 242, the pump motor 720 and a blower motor 830 in parallel across the lines 824 and 826 so that when the switches 820 close, the heater is energized and all the motors 242, 720 and 830 are energized.

A switch 832 is normally held in engagement with a contact 834 by the knife arm 380. We connect the solenoid winding 328 and the counter mechanism solenoid 540 in parallel between contact 834 and the arm 314 of the upper switch responsive to the feeler 312 first engaged by an original inserted in the machine. Before the original is inserted, arm 314 engages a contact 836. We connect a glow lamp 838 indicating "insert" between contact 836 and a contact 840 engaged by the arm 668 of the switch which indicates that no repeat copies are to be made. Arm 668 is connected to line 826. From the structure just described, it will be apparent that when the power switches 820 have been closed the circuit of lamp 838 is complete from line 824 through arm 832 and contact 834, through winding 328, through arm 314 and contact 836, through the lamp 838 and through contact 840 and arm 668 to conductor 826. Thus lamp 838 indicates that the machine is ready to receive an original.

With the machine in the condition just described, when a copy is to be made the original is inserted into the original transport mechanism to engage feeler 312 to move arm 314 out of engagement with contact 836 and into engagement with a contact 842. It will be understood that with lamp 838 in the circuit, winding 328 does not carry sufficient current to actuate the solenoid. When, however, arm 314 moves into engagement with contact 842, the winding is energized to pivot lever 334 to permit a switch arm 844 to engage a contact 846. The engagement of arm 844 with contact 846 energizes a relay winding 848 to close switches 850 and 852 to connect power from the fuses 804 and 806 to secondary control lines 854 and 856. In response to this operation, power is applied across the exposure lamps 858 and 860. At the same time, the high voltage power supply 862 is connected between line 824 and line 856 to apply power to the corona wires 82.

Engagement of the arm 314 with contact 842 also applies power to solenoid winding 540 of the counter mechanism 546 to step cam 564 through one step.

As the orginal travels through the orginal transport mechanism, it engages a second feeler 315 to operate a switch 864 having an arm 866 to move the arm out of engagement with a contact 868 and into engagement with a contact 870. This operation completes a circuit to winding 848 bypassing arm 844. Ultimately, the trailing edge of the original leaves the feeler 312 and arm 314 moves from contact 842 back to contact 836. Now, the solenoid 328 and the solenoid 540 are de-energized and arm 380 is permitted to operate the cutter mechanism. When this happens, arm 832 moves out of engagement with contact 834 and into engagement with a contact 872. As will be explained hereinbelow, this operation steps the multiple copy mechanism when the latter has been set to make more than one copy. Ultimately, the trailing edge of the original leaves the feeler 315 and arm 866 moves back into engagement with contact 868. Winding 848 is de-energized and the machine is set for the next copying operation.

As has been explained hereinabove, where more than a single copy is to be made, shaft 642 is rotated to move the brush 700 to an intersegmental space corresponding to the number of copies which are to be made. Let us assume by way of example that brush 700 has been moved into engagement with that space which corresponds to three copies. As this setting is made, arm 668 moves into engagement with a contact 872 connected to one terminal of the motor 670 and to the terminal of a primary winding 876 connected to conductor 824. We connect the lamp 660 across the secondary winding 878 associated with winding 876. It will be apparent that when such a multiple copy setting is made, the projection bulb 660 illuminates a number corresponding to the number of copies.

With the machine set to make multiple copies, when the knife arm moves it permits arm 832 to engage contact 872. This operation pulses motor 670 to initiate movement of the motor to bring the brush 700 into engagement with a segment 696 to provide a holding circuit for the motor so long as the brush 700 is in engagement with a segment. When the brush leaves the segment to engage an intersegmental space, the motor circuit is broken. This repeat operation continues until shaft 642 returns to its initial position to move arm 668 out of engagement with contact 874 and back into engagement with contact 840.

As has been explained hereinabove, each time a paper feeding operation begins, winding 540 is energized to move cam 564 through one step. After a predetermined number of steps of the cam, switch 576 closes to connect the toner replenishing circuit indicated generally by the reference character 880 across lines 824 and 856. Circuit 880 comprises a diode 862 and a capacitor 884 forming a rectifier to provide a direct current potential on a conductor 886. A current limiting resistor 888 provides a suitable potential for illuminating the lamp 758 of the toner monitoring mechanism. A voltage regulating tube

890 regulates the voltage on conductor 886. As has also been explained hereinabove, light from the lamp 758 passes through the liquid developer toward the photocell 762 which we connect in series with a resistor 892 between line 824 and conductor 886. When the photocell 762 receives sufficient light, it conducts enough current to energize a relay winding 894 polarized by a diode 896 connected to the common terminal of voltage dividing resistors 898 and 900 connected between line 824 and line 886. When the winding 894 is energized, it closes a normally open switch 902 to energize the winding 904 of the valve assembly 800 to add toner to the liquid developer.

We connect switch 714 in series with a glow tube 906 between lines 824 and 826 so that when the supply of liquid developer reaches a predetermined low level, lamp 906 is illuminated to indicate that the supply of liquid developer must be replenished. A manually operable pushbutton switch 908 permits relay 894 to be energized to add toner manually if desired.

The electrical circuit illustrated in FIGURE 30 is readily adapted for use in connection with the repeat copy mechanism shown in FIGURES 19 to 22. It also may be adapted for use with the form of our copy machine which uses dry developer. Where the alternate form of repeat copy mechanism is employed, we merely feed the signal which is shown as being applied to motor 670 in FIGURE 30 to the solenoid 612.

Figure 11:
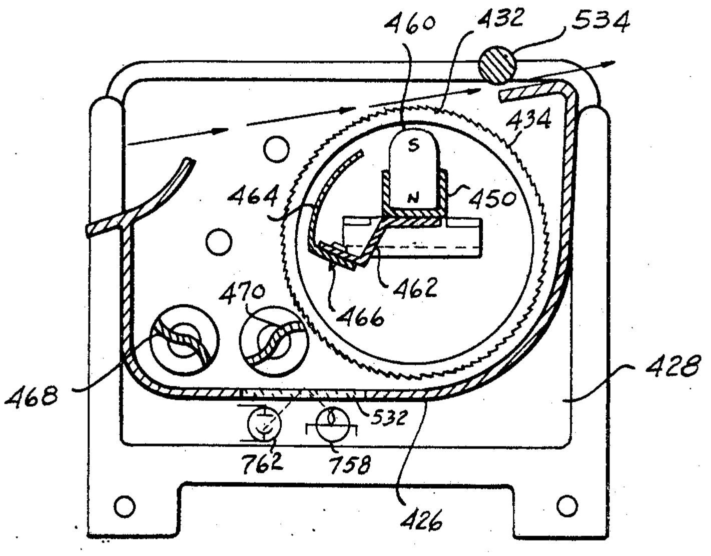
FIGURE 11 is a side elevation of the dry developer system of the form of our copier shown in FIGURE 1.
Figure 12:
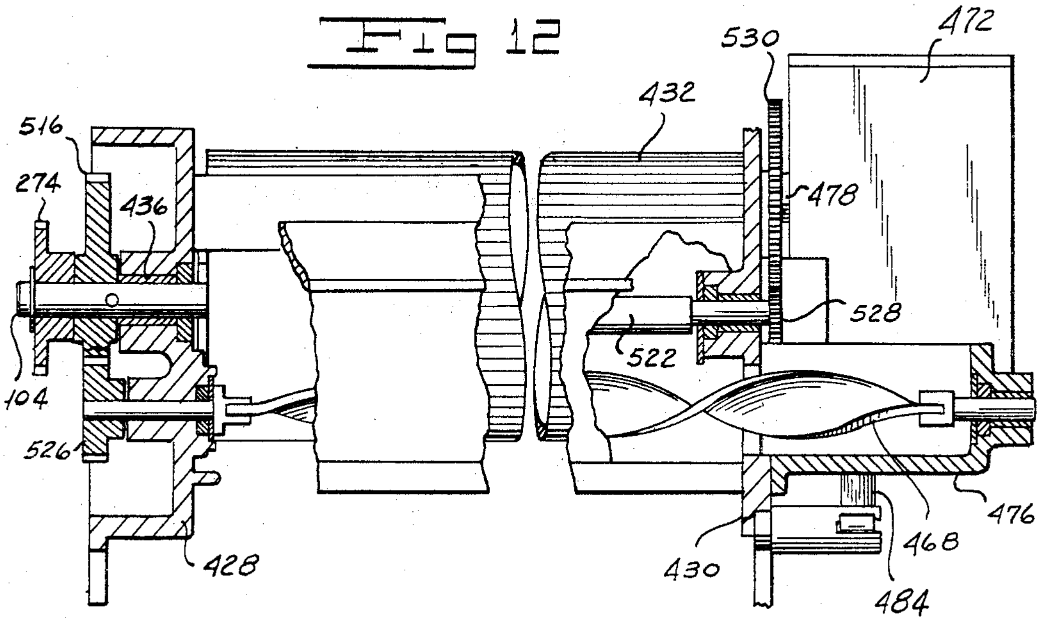
FIGURE 12 is an elevational view of the dry toner system with parts broken away and with other parts shown in section of the form of our improved copier shown in FIGURE 1.

In order to adapt the circuit of FIGURE 30 for use with the form of our machine using the dry developer, we may of course eliminate the pump motor 720. In order to energize the clapper solenoid 500, as the sheet of copy paper enters the space between the roll 102 and the clapper, we may connect the solenoid 500 in parallel with the illumination lamps 858 and 860 so that the solenoid will be energized in response to the closing of switches 850 and 852. If desirable, we may connect a delay network 501 in series with the winding 500 to prevent premature operation of the clapper. We replace the solenoid 904 of the liquid developer replenishing system with the winding 486 of the dry system. For purposes of simplicity, we have indicated the connections for the dry developer system in phantom in FIGURE 30. It will be appreciated further that, as is indicated in FIGURE 11, where the dry developer system is employed, the sensor monitoring arrangement operates on reflected light rather than on transmitted light. The circuit parameters can readily be adjusted for this operation.

In operation of our improved copy machine with the lid closed and the machine plugged in, switches 820 are closed, for example, in response to the operation of the pushbutton 32. The machine is then set for operation. Heater 128, motors 242, 720 and 830 are energized and the "insert" lamp 838 indicates that the machine is ready to receive an original. Considering the form of our machine which employs the wet developer system and the alternate form of repeat copy mechanism shown in FIGURES 23 and 24, and assuming that the apparatus is set to make multiple copies so that the baffle 216 occupies the broken line position shown in FIGURE 4, when an original is inserted into the transport mechanism 26, rolls 166 and 168 feed it through the mechanism. It first engages the upper feeler 312 to actuate switch 314 to move the arm of the switch into engagement with contact 842. This turns the "insert" light out and energizes winding 328 to move arm 844 into engagement with contact 846 to energize winding 848 to close switches 850 and 852. This operation follows from movement of the lever 344 to the right as viewed in FIGURE 7 to engage the brake shoe 342 with the brake drum to couple the feed roll 58 to the shaft 60 to cause the copy material to be advanced successively through the cutting zone 46, the charging zone 48, the exposure zone 50 and the developer 52.

Concomitantly with the energization of the lamps 858 and 860, the corona wires 82 are energized. As the advancing copy material passes through zone 48, it receives an electrical charge. From this zone, it passes through the exposure zone 50. Light from the lamp 196, indicated schematically in FIGURE 30 by 858 and 860, produces an image of the original which is translated by the optical system 302 through window 92 to the charged copy material. In response to this image, the copy material loses its charge over the relatively lighter areas of the image and retains its charge over the relatively darker areas.

Having passed through the zone 50, the copy material carrying the latent electrostatic image of the original enters the developing zone 52. Where our liquid developer system is employed, the copy material passes through the space 732 between the trough 728 and the upper guide 738 where it is subjected to the action of the liquid developer. It picks up particles of the toner material in the charged areas and then passes out between the squeeze rolls 742 and 744 to the fixing zone 52.

As the leading edge of the original engages the lower feeler 315, it operates switch 864 to move the arm 866 out of engagement with contact 868 and into engagement with contact 870. This operation bypasses switch 844. When the trailing edge of the original leaves the feeler 312, arm 314 returns to contact 842 to de-energize winding 328. When this course, finger 422 trips the trigger 424 and the cutter operates to cut the copy to the length of the original. When the cutter operates switch 832 moves into engagement with contact 872 to pass a pulse to motor 670. The copying operation continues until the trailing edge of the original leaves feeler 315 to permit arm 866 to return to contact 868 so that the parts are back in their initial condition.

Movement of arm 832 into engagement with contact 872 to pulse motor 670 initiates such movement of the motor as will bring contact 700 into engagement with a segment 696 to complete the motor circuit to step the repeat copy mechanism through one step in the direction of a decreasing number of copies. As copies are made, this operation continues until shaft 642 is back in its single copy position wherein arm 668 is in engagement with contact 840 rather than in engagement with contact 874. In this position, lamp 660 is out and lamp 838 will be energized to indicate that the apparatus is in condition to receive a copy.

Each time an original moves arm 314 into engagement with contact 842, the winding 540 receives a pulse to step cam 564 through one step. Each sixth step, the follower 556 permits switch 576 to close to energize the toner monitoring system. When this occurs if the toner content of the developer, whether it be the liquid developer or the dry developer, is too low, photocell 762 is energized to operate relay 894 to close switch 902 to energize the winding 904 in the liquid developer system, or the winding 486 in the dry developer system. It will be apparent from the description hereinabove that this operation replenishes the amount of toner in the developer. Alternatively, the monitoring system can be energized by closing pushbutton 908. If in the liquid developer system the developer is at a predetermined low level, lamp 906 is turned on to indicate that more developer should be added.

If access is desired to the path of the original, latch 325 can be released and the unit 26 may readily be removed from the machine. If access is desired to the path of the copy material, latch 234 is released and the unit 54 can be swung away from the machine. With the cover removed, the upper feed rolls can readily be lifted out of the machine to provide access to those parts.

It will be seen that we have accomplished the objects of our invention. We have provided an electrostatic copier which overcomes the disadvantages of the prior art. Our machine makes a copy which is of precisely the same length as the original. We so construct our machine as to permit ready access to the path of the original and to the path of the copy material. Our machine is adapted for use with either a liquid developer system or a dry developer system. It has mechanism which permits a number of copies of a single original to be made without reinsertion of the original into the machine. It is simple and compact for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In apparatus for producing a copy of an original, an exposure window, an original transport system for carrying an original past said window, said transport system adapted to receive an original at an input location and adapted to return an original at a return location, means adapted to be set alternatively to direct an original to said return location or to said input location, means normally positioning said directing means to direct an original to said return location, means for setting said directing means to direct an original to said input location, a screen, a disc carrying indicia, a lamp positioned adjacent said disc to project indicia onto said screen, means responsive to said setting means for illuminating said lamp to project indicia corresponding to the number of copies to be made onto said screen, means responsive to passage of an original through said system for actuating said setting means in a direction to permit said normally positioning means to move said directing means to direct said original to said return location and for resetting said disc.

2. In apparatus for producing a copy of an original, an exposure window, an original transport system for carrying an original past said window, said transport system adapted to receive an original at an input location and adapted to return the original at a return location, settable means adapted to be set alternatively to direct an original to said return location or to said input location, means normally positioning said directing means to direct an original to said return location, means for setting said directing means to direct an original to said input location, means comprising a disc carrying contacts separated by insulating spaces and a brush adapted to engage said contacts and spaces, means responsive to said setting means for positioning said brush in engagement with a space corresponding to the number of copies to be made, a motor adapted to be energized to actuate said setting means in a direction to permit said normally positioning means to move said directing means to direct said original to said return location, motor circuit means responsive to passage of said original through said transport system for producing an initial movement of said motor, means responsive to said initial movement for moving said brush into engagement with a contact, and means comprising said brush and a contact engaged thereby for holding said motor circuit means for a movement of said setting means corresponding to one copy.

3. In apparatus for producing a copy of an original, an exposure window, an original transport system for carrying an original past said window, said transport system adapted to receive an original at an input location and adapted to return the original at a return location, means adapted to be set alternatively to direct an original to said return location or to said input location, means normally positioning said directing means to direct an original to said return location, means for setting said directing means to direct an original to said input location, a motor adapted to be energized to actuate said setting means in a direction to permit said normally positioning means to move said directing means to direct said original to said return location, motor circuit means responsive to passage of said original through said transport system for producing an initial movement of said motor, and means responsive to said initial movement for holding said motor circuit means for continued movement of said motor.

4. In copy-making apparatus having copy material feeding means adapted to be energized and an energizable light source and an exposure window and an original transport system for carrying an original along a predetermined path past said window, a first switch positioned along said path at a location ahead of said window and adapted to be actuated by an original moving along said path, a second normally open switch positioned along said path at a location beyond said window and adapted to be closed by an original moving along said path, means responsive to actuation of said first switch by the leading edge of an original moving along said path for energizing said feeding means and said light source, and a holding circuit for said light source including said second normally open switch, said feeding means being de-energized when the trailing edge of said original leaves said first switch, said light source being de-energized when the trailing edge of said original leaves said second switch.

5. In copy-making apparatus having copy material feeding means adapted to be energized and an energizable light source and an energizable corona and an original transport system for carrying an original along a predetermined path, a first switch positioned along said path and adapted to be actuated by an original moving along said path, a second normally open switch positioned along said path at a location spaced from said first switch and adapted to be actuated by an original moving along said path, means responsive to actuation of said first switch by the leading edge of an original moving along said path for energizing said feeding means and said light source and said corona, a holding circuit for said light source and said corona including said second normally open switch, said feeding means being de-energized when the trailing edge of said original leaves said first switch, said holding circuit being interrupted when the trailing edge of said original leaves said second switch to de-energize said light source and said corona.

6. An original transport system for an electrostatic copier having a housing provided with vertically spaced inlet and outlet passages, including in combination an exposure window, a pair of feed-in rolls for receiving an original inserted into said inlet passage, means including respective pairs of stationary guides for directing said original along a pair of generally vertical and generally parallel spaced paths, said first path leading from said feed-in rolls to a first point past said exposure window, said second path leading from a second point laterally spaced from said first point upwardly past said outlet to a third point adjacent said feed-in rolls, a fixed guide for translating an original from said first point to said second point and means for selectively diverting an original from said second path to said outlet.

7. An original transport system for an electrostatic copier having a housing provided with vertically spaced inlet and outlet passages, including in combination an exposure window, a pair of feed-in rolls for receiving an original inserted into said inlet passage, means including respective pairs of stationary guides for directing said original along a pair of generally vertical and generally parallel spaced paths, said first path leading from said feed-in rolls to a first point past said exposure window, said second path leading from a second point laterally spaced from said first point upwardly past said outlet to a third point adjacent said feed-in rolls and a fixed guide for translating an original from said first point to said second point.

References Cited

UNITED STATES PATENTS

| | | | |
|---|---|---|---|
| 3,181,420 | 5/1965 | Rautbord | 95—1.7 |
| 3,272,100 | 9/1966 | Teutsch | 95—1.7 |
| 3,005,389 | 10/1961 | Limberger | 95—1.7 |
| 3,088,386 | 5/1963 | Sugarman | 95—1.7 |
| 3,040,704 | 6/1962 | Bliss | 118—637 |
| 3,059,614 | 10/1962 | Limberger | 118—637 |
| 2,791,949 | 5/1957 | Simmons | 95—1.7 |
| 2,986,442 | 5/1961 | Broding. | |
| 3,005,388 | 10/1961 | Limberger | 95—1.7 |
| 3,091,169 | 5/1963 | Taini | 95—77.5 |

FOREIGN PATENTS

| | | |
|---|---|---|
| 1,324,009 | 3/1963 | France. |

JOHN M. HORAN, Primary Examiner

U.S. Cl. X.R.

355—64, 69